United States Patent
Nakai et al.

(10) Patent No.: US 6,777,492 B1
(45) Date of Patent: Aug. 17, 2004

(54) GRAFT COPOLYMER AND THERMOPLASTIC RESIN COMPOSITION CONTAINING THE SAME

(75) Inventors: Yoshihiro Nakai, Hatsukaichi (JP); Hideyuki Fujii, Otake (JP); Hisaya Yokohama, Toyohashi (JP); Takahiro Ikebe, Iwakuni (JP); Nobumitsu Fukuyama, Iwakuni (JP); Hideyuki Shigemitsu, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/088,904

(22) PCT Filed: Sep. 27, 2000

(86) PCT No.: PCT/JP00/06645

§ 371 (c)(1),
(2), (4) Date: Jul. 19, 2002

(87) PCT Pub. No.: WO01/23449

PCT Pub. Date: Apr. 5, 2001

(30) Foreign Application Priority Data

Sep. 27, 1999 (JP) ............................................ 11/273462

(51) Int. Cl.⁷ ......................... C08L 51/04; C08F 279/02
(52) U.S. Cl. ........................... 525/80; 525/83; 525/69; 525/304; 525/308; 525/316; 524/504
(58) Field of Search .............................. 525/80, 83, 69, 525/304, 308, 316; 524/504

(56) References Cited

U.S. PATENT DOCUMENTS

| 3,969,431 | A | * | 7/1976 | Gallagher | ..................... 525/82 |
|---|---|---|---|---|---|
| 4,965,315 | A | | 10/1990 | Maeda et al. | |
| 5,166,003 | A | | 11/1992 | Makinae et al. | |
| 5,225,496 | A | | 7/1993 | Yamamoto et al. | |
| 5,346,952 | A | * | 9/1994 | Hongo et al. | .................. 525/68 |
| 5,898,043 | A | * | 4/1999 | Uemae et al. | ............... 523/204 |
| 6,306,961 | B1 | | 10/2001 | Tone et al. | |

FOREIGN PATENT DOCUMENTS

| JP | 47-047863 | 12/1972 |
|---|---|---|
| JP | 59-049245 | 12/1984 |
| JP | 3-68329 | 10/1991 |
| JP | 10-77363 | 3/1998 |
| JP | 10-259229 | 9/1998 |
| WO | WO 98/47961 | 10/1998 |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

The graft copolymer (G) of the present invention is a graft copolymer which is prepared by emulsion graft polymerization of a rubber polymer comprising 0–50% by weight of a butadiene unit and 50–100% by weight of a (meth)acrylate unit and at least one monomer selected from aromatic alkenyl compound, methacrylate, acrylate and vinyl cyanide compound, said graft copolymer containing 0.5–2.0% by weight of an emulsifier residue. The thermoplastic resin composition containing the graft copolymer of the present invention causes less gas evolution during the molding, provides a molded article with good gloss of molding, and has excellent weather resistance, impact resistance and fluidity.

21 Claims, No Drawings

GRAFT COPOLYMER AND THERMOPLASTIC RESIN COMPOSITION CONTAINING THE SAME

TECHNICAL FIELD

The present invention relates to a thermoplastic resin composition having excellent weather resistance, impact resistance, fluidity, and gloss of molding, in which gas evolution during the molding is remarkably prevented.

This application is based on a patent application (Japanese Patent Application No. Hei 11-273462) filed in Japan, the content of which is incorporated herein by reference.

BACKGROUND ART

An improvement in impact resistance of resin materials is industrial useful because it increases uses of materials and makes it possible to reduce the thickness of molded articles and to enlarge the size of them. Therefore, various methods for improving the impact resistance of the resin materials have been studied.

As the material whose impact resistance was enhanced by using a rubber polymer in combination with a rigid resin, for example, ABS resin, high-impact polystyrene resin, modified PPE resin and MBS resin-reinforced polyvinyl chloride resin have already been employed industrially.

In particular, as the resin material having good weather resistance, using a saturated rubber component such as alkyl (meth)acrylate rubber is employed as a rubber polymer, for example, an ASA resin as a weather resistible ABS resin has been suggested.

As the method of preventing pearled gloss (pearled gloss defective) of colored molded articles as a drawback of the ASA resin, for example, a method of using a multi-layer crosslinked acrylic rubber containing a diene rubber in particles is suggested in Japanese Patent Application, Second Publication No. Sho 47-47863 and Japanese Patent Application, Second Publication No. Sho 59-49245.

Furthermore, a method of improving moldability and a method of improving balance between the gloss and impact resistance are disclosed in Japanese Patent Application, Second Publication No. Hei 3-66329. This publication suggests to use a composite rubber graft copolymer which contains a diene rubber enlarged by an acid group-containing copolymer latex in particles, and also has an outer-layer portion made of a crosslinked acrylate polymer obtained by using a graft-linking agent a crosslinking agent in combination.

Furthermore, Japanese Patent Application, First Publication No. Hei 10-77383 describes that a resin composition containing graft copolymer has good impact resistance by using a diene rubber which has a specific molecular weight of a toluene-soluble component, specific gel content and specific swell to toluene.

However, these prior arts do not describe with respect to gas evolution in case a resin composition containing a graft copolymer is molded, and gloss of molding in case molding conditions such as molding temperature are changed. The resin composition containing the graft copolymer prepared by the method of the Examples had the following problems. That is, a large amount of the gas is generated when the composition is molten and molded at comparatively high temperature and the gas adheres to the mold or resin surface, thereby to cause poor appearance such as poor gloss of the resulting molded article, and to be likely to make the working environment worse during molding. Although a technique of lowering a molding temperature, i.e. resin temperature, is generally employed to prevent the molding gas from evolving, it makes impossible to obtain a large-size or complicated resin molded article because of lack of fluidity of the resin.

That is, these resin compositions of the prior art had such drawbacks that they are hardly employed as raw materials of various molded articles because of very narrow molding conditions capable of maintaining the operation environment during the molding at good state and improving design of the resulting molded articles.

Therefore, there has not hitherto been found out any material which prevents the molding gas from evolving under wide molding temperature conditions and has good gloss of molding in the resin composition containing an alkyl (meth)actylate rubber, and it has been requested strongly to develop a technique which meets these requirements.

DISCLOSURE OF THE INVENTION

An object of the present invention is to provide a thermoplastic resin composition which prevents a gas from evolving during the molding on wide molding temperature conditions and exhibits good gloss of molding, and also has excellent weather resistance, impact resistance and fluidity.

The present inventors have intensively studied about the fluidity of a resin composition containing a specific graft copolymer as well as the amount of a gas evolved during the molding at high temperature. Surprisingly, they have found that a resin composition, which contains a specific graft copolymer and contains an emulsifier residue in a specific range, has good fluidity and causes less gas evolution during the molding at high temperature, thus accomplishing the present invention.

That is, the graft copolymer (G) of the present invention is a graft copolymer which is prepared by emulsion graft polymerization of a rubber polymer comprising 0–50% by weight of a butadiene unit and 50–100% by weight of a (meth)acrylate unit and at least one monomer selected from aromatic alkenyl compound, methacrylate, acrylate and vinyl cyanide compound, said graft copolymer containing 0.5–2.0% by weight of an emulsifier residue.

BEST MODE FOR CARRYING OUT THE INVENTION

The present invention will be described in detail below.

The rubber polymer which constitutes the graft copolymer (G) of the present invention comprises 0–50% by weight of a butadiene unit and 50–100% by weight of a (meth)acrylate unit. When the proportion of the butadiene unit in the rubber polymer exceeds 50% by weight, the weather resistance of the resulting thermoplastic resin composition containing the graft copolymer (G) is lowered, which is not preferable.

The butadiene unit is a polymer composed of a diene unit such as 1,3-butadiene or isoprene and, if necessary, a monomer unit capable of copolymerizing with the diene unit.

As the (meth)acrylate, for example, there can be preferably used alkyl acrylate such as methyl acrylate, ethyl acrylate, n-propyl acrylate, n-butyl acrylate, or 2-ethylhexyl acrylate; and alkyl methacrylate such as hexyl methacrylate, 2-ethylhexyl methacrylate, or n-lauryl methacrylate. Particularly, N-butyl acrylate is preferably employed.

The rubber polymer is an alkyl (meth)acrylate homopolymer, or a copolymer containing a butadiene unit and a (meth)acrylate unit, or a composite rubber polymer of a butadiene polymer and a (meth)acrylate polymer.

When employing the copolymer containing a butadiene unit and a (meth)acrylate unit, the copolymer is preferably employed after enlarging by an inorganic acid, an inorganic salt or an acid group-containing copolymer latex because of excellent impact resistance of the thermoplastic resin composition containing the graft copolymer (G).

When employing the composite rubber polymer of a butadiene polymer and a (meth)acrylate polymer, it is preferably to employ after enlarging the butadiene polymer using at least one enlarging agent selected from inorganic acid, inorganic salt, organic acid, inorganic acid anhydride and acid group-containing copolymer latex to a particle diameter within a range of 200–500 nm, followed by emulsion polymerization of the (meth)acrlylate component in the presence of this enlarge butadiene polymer latex. When employing such a composite rubber polymer, the impact resistance of the thermoplastic resin composition containing the graft copolymer (G) is excellent and the pigmentation also becomes superior.

The acid group-containing copolymer latex employed as the enlarging agent is a copolymer latex having an acid group-containing unit and an alkyl acrylate unit and is known to Japanese Patent No. 1,146,549 and Japanese Patent No. 1,556,865. The acid group-containing monomer includes, for example, acrylic acid, methacrylic acid, itaconic acid, or crotonic acid, while an alkyl acrylate having 1–12 carbon atoms is preferable as the alkyl acrylate. The proportion of the acid group-containing monomer in the acid group-containing copolymer is within a range of 3–30% by weight, and more preferably within a range of 10–25% by weight, based on the copolymer, because the stability of the latex is excellent in case of particle-enlarging of the butadiene polymer and the average particle diameter of the resulting enlarged butadiene polymer is easily controlled within a range of 200–500 nm. The weight-average particle diameter of the acid group-containing copolymer in the acid group-containing copolymer latex is preferably within a range of 100–200 nm because the stability of the latex is excellent in case of particle-enlarging of the butadiene polymer and the average particle diameter of the resulting enlarged butadiene polymer is easily controlled within a range of 200–500 nm.

The particle-enlarging can be performed by adding the above acid group-containing copolymer latex to the butadiene polymer latex having a particle diameter of 150 nm or less prepared by the emulsion polymerization.

The lower limit of the weight-average particle diameter of the enlarged butadiene polymer is 200 nm, preferably 300 nm, and more preferably 350 nm. On the other hand, the upper limit is 500 nm, preferably 450 nm, and more preferably 400 nm. When the weight-average particle diameter is within the above range, the impact resistance of the resulting thermoplastic resin composition tends to be excellent.

In case of the emulsion polymerization of a (meth)acrylate component in the presence of an enlarged butadiene polymer having a particle diameter within a range of 200–500 nm, when employing a graft-linking agent and/or a cross inking agent in combination with the (meth)acrylate, the impact resistance and pigmentation of the thermoplastic resin composition containing the graft copolymer (G) are improved, which is preferable.

Examples of the graft-linking agent employed together with the (meth)acrylate include allyl methacrylate, triallyl cyanurate, triallyl isocyanurate and the like. Examples of the crosslinking agent include ethylene glycol dimethacrylate, propylene glycol dimethacrylate, 1,3-butylene glycol dimethacrylate, 1,4-butylene glycol dimethacrylate and the like.

The method of emulsion polymerization of the (meth)acrylate component in the presence of the butadiene polymer latex is not specifically limited and examples thereof include a method of polymerizing by adding a (meth)acrylate monomer mixture containing a crosslinking agent and/or a graft-linking agent to a butadiene polymer latex in a single portion, a method of polymerizing by intermittently adding a (meth)acrylate monomer mixture to a butadiene polymer latex in two or more portions, and a method of continuously adding dropwise a (meth)acrylate monomer mixture to a butadiene polymer latex while polymerizing the (meth)acrylate monomer mixture. Among these methods, the method of polymerizing by adding in a single portion is preferable in view of the impact resistance.

When employing a composite rubber polymer as the rubber polymer in the graft copolymer (G), the lower limit of the amount of the butadiene polymer is preferably 1% by weight, more preferably 5% by weight, and still more preferably 10% by weight, based on 100% by weight of the composite rubber polymer. On the other hand, the upper limit is preferably 50% by weight, more preferably 40% by weight, and still more preferably 30% by weight, based on 100% by weight of the composite rubber polymer. When the amount of the butadiene polymer is within the above range, balance between the weather resistance and impact resistance is excellent.

The lower limit of the weight-average particle diameter of the rubber polymer thus obtained is preferably 200 nm, more preferably 250 nm, and still more preferably 300 nm. On the other hand, the upper limit is preferably 500 nm, more preferably 450 nm, and still more preferably 400 nm. When the weight-average particle diameter of the rubber polymer is within the above range, the impact resistance and pigmentation of the resulting thermoplastic resin composition are excellent.

With respect to the particle size distribution of the rubber polymer, the lower limit of the proportion of particles having a particle diameter of less than 100 nm in the rubber polymer is preferably 1% by weight, more preferably 3% by weight, and still more preferably 5% by weight, because the gloss and impact resistance during the molding at high temperature of the thermoplastic resin composition containing the graft copolymer (G) are excellent. On the other hand, the upper limit is preferably 30% by weight, more preferably 25% by weight, and still more preferably 20% by weight. The method of controlling the particle size distribution of the rubber polymer is not specifically limited and examples thereof include a method of mixing a rubber polymer having a particle diameter of 100 nm or more and a rubber polymer having a particle diameter less than 100 nm, which have been previously prepared, and a method of employing a specific amount of an emulsifier in the preparation of the rubber polymer. Among these methods, the method of employing a specific amount of an emulsifier is preferable because of its simple preparation process. More preferable method is a method of preparing a rubber polymer by the emulsion polymerization method employing an emulsifier having a small molecule occupy area.

The molecule occupy area of the emulsifier employed is within a range of 10–50 $Å^2$, and preferably within a range of 10–40 $Å^2$. When employing the emulsifier having such a molecule occupy area, particles having a particle diameter less than 100 nm are formed in the polymerization of the rubber polymer, resulting in preferable particle size distribution.

Examples of the emulsifier having such a molecule occupy area include sodium or potassium salts of fatty acids such as oleic acid, stearic acid, myristic acid, stearic acid, and palmitic acid, sodiun lauryl sulfate, sodium N-lauroyl sarcosinate, dipotassium alkenylsuccinate, sodium alkyl diphenyl ether disulfonate, and the like. When employing an acid type emulsifier having two or more functional groups in a molecule or a salt thereof among these emulsifiers, gas evolution can be prevented during the molding of the thermoplastic resin composition, which is preferable. Among these, the dipotassium alkenylsuccinate or sodium alkyl diphenyl ether disulfonate is preferable. The dipotassium alkenylsuccinate is more preferable because the rubber polymer can be easily recovered from the latex by coagulating using sulfuric acid. Examples of the dipotassium alkenylsuccinate include dipotassium octadecenylsuccinate, dipotassium heptadecenylsuccinate, dipotassium hexadecenylsuccinate and the like. In this case, other emulsifiers may also be used in combination in the amount of less than 50% by weight based on the amount of the total emulsifier.

The graft copolymer (G) of the present invention is obtained by the emulsion polymerization of the above rubber polymer and at least one monomer selected from aromatic alkenyl compound, methacrylate, acrylate and vinyl cyanide compound in the presence of the emulsifier.

Examples of the aromatic alkenyl compound include styrene, α-methylstyrene, vinyltoluene and the like. Examples of the methacrylate include methyl methacrylate, ethyl methacrylate, 2-ethylhexyl methacrylate and the like. Examples of the acrylate include methyl acrylate, ethyl acrylate, n-butyl acrylate and the like. Examples of the vinyl cyanide compound include acrylonitrile, methacrylonitrile and the like. Among these monomers, a mixture of styrene and acryloitrile is preferable because of excellent thermal stability of the graft copolymer (G).

In this case, the amount of the monomer is not specifically limited but the lower limit of the amount of the monomer is preferably 40 parts by weight, more preferably 50 parts by weight, and still more preferably 60 parts by weight, based on 100 parts by weight of the rubber polymer, because the impact resistance and pigmentation of the thermoplastic resin composition containing the graft copolymer (G) are excellent. On the other hand, the upper limit of the amount of the monomer is preferably 200 parts by weight, more preferably 180 parts by weight, and still more preferably 150 parts by weight, based on 100 parts by weight of the rubber polymer.

The emulsion graft polymerization for preparation of the graft copolymer (G) can be performed by adding at least one selected from aromatic alkenyl compound, methacrylate, acrylate and vinyl cyanide compound to a rubber polymer latex in the presence of an emulsifier, using a conventional radical polymerization technique. Various conventional chain transfer agents can be added in the monomer in order to control the graft ratio and molecular weight of the graft component.

As the radical polymerization initiator, for example, a peroxide, an azo initiator, or a redox initiator employing an oxidizing agent in combination with a reducing agent may be employed. Among these initiators, the redox initiator is preferable and a sulfoxylate initiator employing ferrous sulfate, sodium ethylenediaminetetraacetate, Rongalite and hydroperoxide in combination is particularly preferable.

As the emulsifier, the emulsifier employed in the preparation of the above rubber polymer may be employed as it is and not added before the graft polymerization process, or may be added, if necessary. The emulsifier is not specifically limited, but there can be employed various carboxylates such as dipotassium alkenylsuccinate, sodium alkyldiphenyl ether disulfonate, sodium N-lauroylsuccinate, fatty acid potassium, fatty acid sodium, and rosin soap because the stability of the latex is excellent during the emulsion polymerization and the graft ratio is liable to be enhanced.

The graft copolymer (G) can be recovered by pouring the graft copolymer (G) latex thus prepared into hot water in which a coagulant is dissolved, followed by coagulation and further solidification. As the coagulant, for example, an inorganic acid such as sulfuric acid, hydrochloric acid, phosphoric acid or nitric acid, or a metal salt such as calcium chloride, calcium acetate or aluminum sulfate can be employed. Among these, an inorganic acid is preferably employed as the coagulant because the productivity of the graft copolymer (G) is excellent and the thermal coloration can be prevented during the molding of the thermoplastic resin composition containing the same.

The graft copolymer (G) of the present invention can be obtained by redispersing the graft copolymer (G) recovered by the above method in water or warm water to form a slurry, and washing the slurry thereby to elute an emulsifier residue and a coagulant remained in the graft copolymer (G), followed by recovery in a dehydrator and further drying in an air-dryer.

The amount of the emulsifier residue in the graft copolymer (G) varies depending on the amount of the emulsifier and the conditions of the washing treatment of the graft copolymer (G).

The graft copolymer (G) of the present invention contains the emulsifier residue and the lower limit of the emulsifier residue is 0.5% by weight, while the upper limit of the emulsifier residue is 2% by weight. The lower limit is preferably 1.0% by weight, while the upper limit is preferably 1.5% by weight. In order to adjust to such an amount of the emulsifier residue, control of the amount of the emulsifier or the step of controlling the conditions of the washing treatment of the graft copolymer (G) is required. When the amount of the emulsifier residue in the graft copolymer (G) is adjusted to the above range by this step, the fluidity and gas evolution during the molding of the resulting thermoplastic resin composition become superior.

Regarding the graft copolymer (G), 1% weight loss temperature on the measurement of TG-DTA under the conditions of 20° C./minute is preferably 300° C. or higher, and more preferably 310° C. or higher. When the 1% weight loss temperature is 300° C. or higher, the molding gas evolution during the molding at high temperature of the thermoplastic resin containing the graft copolymer (G) tends to decrease.

Although the graft copolymer (G) may be employed alone, the thermoplastic resin composition of the present invention can be prepared by mixing the other thermoplastic resin (F) with the graft copolymer (G) and optionally kneading the mixture together with the other graft copolymer (S) using a conventional kneader. The amount of the graft copolymer (G) is within a range of 1–100% by weight based on 100% by weight of the thermoplastic resin composition. The amount of the other graft copolymer (S) is within a range of 99–0% by weight based on 100% by weight of the thermoplastic resin composition. The amount of the other thermoplastic resin (F) is within a range of 99–0% by weight based on 100% by weight of the thermoplastic resin composition.

The other graft copolymer (S) is at lest one selected from ABS resin (S-1), ethylene-propylene-non-conjugated diene rubber graft copolymer (S-2) and polyorganosiloxane/(meth)acrylate composite rubber graft copolymer (S-3).

As the ABS resin (S-1), a conventional resin can be employed is obtained by grafting a butadiene rubber with a polymer having at least one unit selected from aromatic alkenyl unit, vinyl cyanide unit and (meth)acrylate unit.

The ethylene-propylene-non-conjugated diene rubber graft copolymer (S-2) is obtained by grafting an EPDM (ethylene-propylene-non-conjugated diene rubber elastic material) with a polymer having at least one unit selected from aromatic alkenyl unit, (meth)acrylate unit and vinyl cyanide unit. EPDM is preferably EPDM in which a weight ratio of ethylene to propylene is within a range from 80:20 to 30:70 and the amount of the non-conjugated diene such as dicyclopentadiene, alkylidenenorbornene or 1,4-hexanediene is within a range of 0.5–30% by mole. Examples of the aromatic alkenyl compound among the monomers employed in the preparation of the ethylene-propylene-non-conjugated diene rubber graft copolymer (S-2) include styrene, α-methylstyrene, vinyltoluene and the like. Examples of the methacrylate include methyl methacrylate, ethyl methacrylate, 2-ethylhexyl methacrylate and the like. Examples of the acrylate include methyl acrylate, ethyl acrylate, n-butyl acrylate and the like. Examples of the vinyl cyanide compound include acrylonitrile, methacrylonitrile and the like. Among these monomers, a mixture of styrene and acryloitrile is preferable because of excellent thermal stability of the resulting ethylene-propylene-non-conjugated diene rubber graft copolymer (S-2). Typical products of the ethylene-propylene-non-conjugated diene rubber graft copolymer (S-2) obtained by the graft polymerization of EPDM and the mixture of styrene and acrylonitrile, i.e. AES resin, are "W220" manufactured by Techno Polymer Co. and "UNIBRIGHT 500" manufactured by Nippon A&L Co., Ltd., which are commercially available. The method of the graft polymerization of EPDM and the monomer is a conventional method such as solution, bulk, bulk-suspension or emulsion polymerization method.

The polyorganosiloxane/(meth)acrylate composite rubber graft copolymer (S-3) is obtained by the graft polymerization of a composite rubber polymer of polyorganosiloxane and a (meth)acrylate polymer, and at least one monomer selected from aromatic alkenyl compound, methacrylate, acrylate and vinyl cyanide compound.

The polyorganosiloxane is not specifically limited, but is preferably polyorganosiloxane having a vinyl group. More preferably, it is polyorganosiloxane comprising 0.3–3% by mole of a vinyl group-containing siloxane and 97–99.7% by mole of a dimethylsiloxane unit, the proportion of a silicon atom having three or more siloxane bonds is 1% by mole or less based on the total silicon atoms in polydimethylsiloxane.

The dimethylsiloxane employed in the preparation of the polyorganosiloxane includes a cyclic dimethylsiloxane with a 3- or poly-membered ring, preferably 3- to 7-membered ring. Specific examples thereof include hexamethylcyclotrisiloxane, octamethylcyclotetrasiloxane, decamethylcyclopentasiloxane, dodecamethylcyclohexasiloxane and the like, and these are used alone or in combination.

The vinyl group-containing siloxane has a vinyl group and is capable of bonding with dimethylsiloxane through a siloxane bond, and various alkoxysilane compounds having a vinyl group are preferable in view of the reactivity with dimethylsiloxane. Specific examples thereof include methacryloyloxysiloxane such as β-methacryloyloxyethyldimethoxymethylsilane, γ-methacryloyloxypropyldimethoxymethylsilane, γ-methacryloyloxypropylmethoxydimethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane; vinylsiloxane such as tetramethyltetravinylcyclotetrasiloxane; and mercaptosiloxane such as p-vinylphenyldimethoxymethylsilane, γ-mercaptopropyldimethoxymethylsilane, and γ-mercaptopropyltrimethoxysilane. These vinyl group-containing siloxanes can be employed alone or in combination.

In order to prepare polyorganosiloxane, first, a siloxane crosslinking agent is optionally added to a siloxane mixture of dimethylsiloxane and vinyl group-containing siloxane and the mixture is emulsified by an emulsifier and water to obtain a latex. Then, the resulting latex is formed into fine particles by using a homomixer for forming into fine particles by a shear force due to high-speed rotation or a homogenizer for forming into fine particles by an ejection force due to a high pressure generator. When employing a high-pressure emulsification device such as homogenizer, the particle size distribution of the polyorganosiloxane latex is lowered, which is preferable. The latex formed into fine particles is added in an aqueous acid solution containing an acid catalyst, and then polymerized at high temperature. The polymerization reaction is terminated by cooling the reaction solution and further neutralizing with an alkali substance such as caustic soda, caustic potash, sodium carbonate or the like.

As the siloxane crosslinking agent, for example, trifunctional or tetrafunctional silane crosslinking agent such as trimethoxymethylsilane, triethoxyphenylsilane, tetramethoxysilane, tetraethoxysilane, tetrabutoxysilane, or the like can be employed.

The emulsifier is preferably an anionic emulsifier and, for example, an emulsifier selected from sodium alkylbenzenesulfonate and sodium polyoxyethylene nonyl phenyl ether sulfate is employed. Among these emulsifiers, a sulfonic acid emulsifier such as sodium alkylbenzenesulfonate, sodium lauryl sulfonate, or the like is preferable. These emulsifiers are employed in the amount within a range of about 0.05–5 parts by weight based on 100 parts by weight of the siloxane mixture.

Examples of the acid catalyst employed in the polymerization of polyorganosiloxane include sulfonic acids such as aliphatic sulfonic acid, aliphatic substituted benzenesulfonic acid and aliphatic substituted naphthalenesulfonic acid; and mineral acids such as sulfuric acid, hydrochloric acid and nitric acid. These acid catalysts can be employed alone or in combination. Among these acid catalysts, aliphatic substituted benzenesulfonic acid is preferable because of excellent stabilization effect of the polyorganosiloxane latex, and n-dodeocylbenzenesulfonic acid is particularly preferable. When employing n-dodeocylbenzenesulfonic acid in combination with the mineral acid such as sulfuric acid, an influence of the color of the emulsifier employed in the polyorganosiloxane latex on the color of the thermoplastic resin composition molded article can be reduced as small as possible.

The size of the polyorganosiloxane particles is not specifically limited, but the weight-average particle diameter is preferably 0.3 μm or less, and more preferably 0.2 μm or less, because of excellent pigmentation of the thermoplastic resin composition.

The amount of the polyorganosiloxane in 100% by weight of the composite rubber polymer of the polyorganosiloxane and (meth)acrylate polymer is preferably within a range of 1–20% by weight. When the amount is less than 1% by weight, the impact resistance is lowered because of small amount of the polyorganosiloxane. On the other hand, when the amount exceeds 20% by weight, the pigmentation of the thermoplastic resin composition molded article containing the graft copolymer (S-3) is lowered sometimes. Since both of the impact resistance and pigmentation of the thermoplastic resin composition molded article containing the graft copolymer (S-3) are excellent, the amount of the polyorganosiloxane in the composite rubber polymer is preferably within a range of 6–20% by weight, and more preferably within a range of 10–20% by weight. When employing a polycarbonate resin as the other thermoplastic resin (F) described hereinafter, the amount of the polyorganosiloxane in 100% by weight of the composite rubber polymer of the polyorganosiloxane and (meth)acrylate polymer is preferably within a range of 1–90% by weight.

As the (meth)acrylate polymer employed in the preparation of the composed, together with the polyorganosiloxane, for example, there can be employed the same (meth)acrylate, crosslinking agent and/or graft-linking agent as those described in the above graft copolymer (G). As the crosslinking agent and graft-linking agent, the same agents as those described in the above graft copolymer (G) can be employed. The amount is preferably within a range of 0.1–10% by weight, more preferably within a range of 0.2–5% by weight, and still more preferably within a range of 0.2–1% by weight, based on the (meth)acrylate polymer. A vinyl monomer capable of copolymerizing with them may be employed in combination.

A mixture of the (meth)acrylate, crosslinking agent and/or graft-linking agent is added in a latex of polyorganosiloxane and the mixture is polymerized by using a conventional radical polymerization initiator to prepare a composite of organosiloxane and a (meth)acrylate polymer. The mixture may be mixed with the polyorganosiloxane latex in a single portion, or may be added dropwise in the polyorganosiloxane latex at a fixed rate. However, the method of mixing with the polyorganosiloxane latex in a single portion is preferable because the impact resistance of the finally obtainable thermoplastic resin composition is excellent.

As the radical polymerization initiator employed in the polymerization, for example, a peroxde, an azo initiator, or a redox initiator employing an oxidizing agent in combination with a reducing agent may be employed. Among these initiators, the redox initiator is preferable and a sulfoxylate initiator employing ferrous sulfate, sodium ethylenediaminetetraacetate, Rongalite, and hydroperoxide in combination is particularly preferable.

In the graft copolymer (S-3), the amount of the graft component obtained by the graft copolymerization of at least one monomer selected from aromatic alkenyl compound, methacrylate, acrylate and vinyl cyanide compound is within a range of 40–80% by weight based on the total amount (100% by weight) of the polyorganosiloxne/(meth)acrylate composite polymer.

When the amount is less than 40% by weight, the pigmentation of the thermoplastic resin composition molded article containing the graft copolymer (S-3) tends to be lowered. On the other hand, when the amount exceeds 80% by weight, the amount of the polyorganosiloxne/(meth)acrylate composite polymer is reduced and, therefore, the impact resistance is liable to be lowered. In view of both of the pigmentation and impact resistance, the amount is preferably within a range of 50–70% by weight, and more preferably within a range of 50–60% by weight.

Examples of the aromatic alkenyl compound employed in the graft component include styrene, α-methylstyrene, vinyltoluene and the like. Examples of the methacrylate include methyl methacrylate, ethyl methacrylate, 2-ethylhexyl methacrylate and the like. Examples of the acrylate include methyl acrylate, ethyl acrylate, n-butyl acrylate and the like. Examples of the vinyl cyanide compound include acrylonitrile, methacrylonitrile and the like. Among these monomers, a mixture of styrene and acrylonitrile is preferable in view of thermal stability of the thermoplastic resin composition containing the graft copolymer (G).

The other thermoplastic resin (F) is not specifically limited and examples thereof include methyl polymethacrylate, acrylonitrile-styrene copolymer (AS resin), acrylonitrile-styrene-N-substituted maleimide terpolymer, styrene-maleic anhydride copolymer, styrene-maleic anhydride-N-substituted maleimide terpolymer, polycarbonate resin, polybutylene terephthalate (PBT resin), polyethylene terephthalate resin (PET resin), polyvinyl chloride; polyolefin such as polyethylene, polypropylene; styrene elastomer such as styrene-butadiene-styrene (SBS), styrene-butadiene (SBR), hydrogenated SBS, and styrene-isoprene-styrene (SIS); various olefin elastomers; various polyester elastomers; polystyrene, methyl methacrylate-styrene copolymer (MS resin), acrylonitrile-styrene-methyl methacrylate copolymer, polyacetal resin, modified polyphenylene ether (modified PPE resin), ethylene-vinyl acetate copolymer, PPS resin, PES resin, PEEK resin, polyarylate, liquid crystal polyester resin, and polyamide resin (nylon). These thermoplastic resins can be used alone in combination thereof.

In the present invention, 5–40 parts by weight of a bromine flame retardant, 0.1–20 parts by weight of an antimony compound and 1–40 parts by weight of a phosphorous flame retardant can be further mixed with 100 parts by weight of the thermoplastic resin composition comprising 1–100% by weight of the graft copolymer (G), 99–0% by weight of the other graft copolymer (S) and 99–0% by weight of the other thermoplastic resin (F) for the purpose of providing the thermoplastic resin composition with the flame retardancy.

The bromine flame retardant is not specifically limited and a conventional one can be employed. For example, there can be preferably employed tetrabromobisphenol A and a derivative thereof, tetrabromobisphenol S, tetrabromophthalic anhydride, hexabromobenzene, brominated diphenyl ether, brominated polycarbonate oligomer and a terminal modified product thereof, brominated epoxy resin (bispbenol A type, novolak type) and a terminal modified product thereof, brominated phenoxy resin, trisbromophenyl phosphate, brominated polystyrene, and brominated phenylene ether oligomer. The bromine flame retardant is preferably a bromine flame retardant in which the bromine content is 10% by weight or more, and more preferably within a range of abut 40–85% by weight, thought it depends on types of the bromine flame retardant to be employed. When employing such a bromine flame retardant, the thermoplastic resin composition is provided with high flame retardancy, which is preferable. The higher the bromine content, the more the bromine flame retardant can provide the thermoplastic resin composition with the flame retardancy using a small amount of the bromine flame retardant without impairing physical properties of the thermoplastic resin other than the flame retardancy.

The amount of the bromine flame retardant is usually within a range of 5–40 parts by weight, and preferably within a range of 10–35 parts by weight, based on 100 parts by weight of the thermoplastic resin composition, though it depends on the degree of the flame retardancy to be required. When the amount is less than 5 parts by weight, the effect of providing the thermoplastic resin with the flame retardancy becomes poor. On the other hand, when the amount exceeds 40 parts by weight, the impact resistance and heat resistance of the thermoplastic resin composition are lowered.

The antimony compound can be added to further improve the flame retardancy of the thermoplastic resin composition, and various antimony compounds can be employed. Examples thereof include antimony trioxide, antimony pentaoxide, and antimonate such as sodium antimonate. As these antimony compounds, surface-treated antimony compounds are commercially available and may be employed.

The amount of the antimony compound is within a range of 0.1–20% by weight based on 100 parts by weight of the thermoplastic resin composition comprising 1–100% by weight of the graft copolymer (G), 99–0% by weight of the other graft copolymer (S) and 99–0% by weight of the other thermoplastic resin (F). When the amount exceeds 20 parts by weight, the impact resistance of the finally obtainable thermoplastic resin composition is lowered sometimes. On the other hand, when the amount is less than 0.1 parts by weight, an improvement in flame retardancy due to the antimony compound becomes insufficient sometimes.

The phosphorous flame retardant employed in the present invention is not specifically limited and a conventional one can be employed. Examples thereof include monophosphate such as trimethyl phosphate, triethyl phosphate, tributyl phosphate, trioctyl phosphate, tributoxyethyl phosphate, triphenyl phosphate, trixyl phosphate, tricresyl phosphate, cresylphenyl phosphate, xyldiphenyl phosphate, octyldiphenyl phosphate, diisopropylphenyl phosphate, tris (chloroethyl) phosphate, diphenyl methylphosphate, diethyl phenylphosphate, and resolcinyl diphenylphosphate; phenylenebis (diphenylphosphate) such as bisphenol A bisphosphate, hydroquinone-bisphosphate, and dihydroxybiphenyl-bisphosphate; polyphosphate such as phenylenebis(dixylylphosphate), phenylenebis (ditolylphosphate), bisphenol A-bis(diphenylphosphate), bisphenol A-bis(dixylylphosphate), bisphenol A-bis (ditolylphosphate), biphenylenebis(diphenylphosphate), biphenylenebis(dixylylphosphate), and biphenylenebis (ditolylphosphate); and inorganic compound such as polyphosphoric acid and red phosphorous. Preferably, monophosphate, phenylenebis(diphenylphosphate) or red phosphorous is employed. These phosphorous flame retardants can be employed alone or in combination.

The amount of the phosphorous flame retardant is usually within a range of 1–40 parts by weight, and preferably within a range of 2–30 parts by weight based on 100 parts by weight of the thermoplastic resin composition comprising 1–100% by weight of the graft copolymer (G), 99–0% by weight of the other graft copolymer (S) and 99–0% by weight of the other thermoplastic resin (F), though it depends on the degree of the flame retardancy to be required and types of the phosphorous compound. When the amount is less than 1 part by weight, the effect of providing the thermoplastic resin composition with the flame retardancy becomes poor. On the other hand, when the amount exceeds 30 parts by weight, the impact resistance and heat resistance are lowered. In this case, 0–20 parts by weight of the bromine flame retardancy is preferably employed in combination with 1–40 parts by weight of the phosphorous flame retardant.

For the purpose of further improving the flame retardancy, at least one auxiliary flame retardant selected from polytetrafluoroethylene, chlorinated polyethylene and silicone oil may be incorporated into the thermoplastic resin composition.

The composition of the polytetrafluoroethylene is not specifically limited and a conventional one can be employed, but polytetrafluoroethylene having a molecular weight of 1,000,000 or more is preferable. When the molecular weight of the polytetrafluoroethylene is less than 1,000,000, a large amount of the above flame retardant is required to meet high flame retardancy, e.g. UL 94 Standard (Under Writers Laboratories Inc., USA) test. As a result, the moldability and the mechanical strength of the finally obtainable thermoplastic resin composition are lowered sometimes.

Types of the chlorinated polyethylene are not specifically limited and a conventional one can be employed. A chlorinated polyethylene whose chlorine content is within a range of 20–70% by weight is preferable and a chlorinated polyethylene whose chlorine content is within a range of 30–50% by weight is more preferable.

Examples of the silicone oil include polydimethylsiloxane, polymethylphenylsiloxane, polymethylhydrodienesiloxane and the like. There can also be employed a modified silicone oil obtained by epoxy modification, alkyl modification, amino modification, carboxyl modification and alcohol modification of an alkyl group of a polydilakylsiloxane in which the number of the carbon of the alkyl group is usually within a range of 1–18. The viscosity of the silicone oil is usually within a range of 1–10000 cSt at a temperature of 25° C., preferably within a range of 5–5000 cSt, and more preferably within a range of 5–2000 cSt. When the viscosity is less than 1 cSt, the desired effect of improving the flame retardancy is poor. On the other hand, when the viscosity exceeds 10000 cSt, the compatibility with the resin is lowered.

The polytetrafluoroethylene, chlorinated polyethylene and silicone oil may be used alone or in combination, and are incorporated in the total amount within a range of 0.0001–5 parts by weight based on 100 parts by weight of the thermoplastic resin composition comprising 1–100% by weight of the graft copolymer (G), 99–0% by weight of the other graft copolymer (S) and 99–0% by weight of the other thermoplastic resin (F). When the amount is less than 0.0001 parts by weight, drip during the combustion is liable to occur, that is, it tends to become insufficient to provide with high flame retardancy. On the other hand, when the amount exceeds 5 parts by weight, the moldability as well as appearance, heat resistance and impact resistance of the molded article tend to be lowered. When employing the silicone oil, the silicone oil breeds out on the surface of the resin sometimes. When employing the silicone oil alone, the amount is preferably within a range of 0.005–2 parts by weight based on 100 parts by weight of the thermoplastic resin composition.

These auxiliary flame retardants may be added alone or in combination with the chlorinated polyethylene or silicone oil. Preferably, polytetrafluoroethylene is preferably employed alone because the polytetrafluoroethylene is superior in effect of improving the flame retardancy to the chlorinated polyethylene or silicone oil.

For the purpose of further enhancing the stiffness and lowering the linear expansion coefficient, an inorganic filler can be incorporated into the thermoplastic resin composition. Examples of the inorganic filler, which can be added, include one or more inorganic fillers such as glass fiber, carbon fiber, wollastonite, talc, mica, glass foil, and potassium titanate. The amount of the inorganic filler is preferably within a range of 1–50 parts by weight, and more preferably within a range of 5–40 parts by weight, based on 100 parts by weight of the thermoplastic resin composition comprising 1–100% by weight of the graft copolymer (G), 99–0% by weight of the other graft copolymer (S) and 99–0% by weight of the other thermoplastic resin (F). When the inorganic filler is incorporated in the amount within the above range, the thermoplastic resin composition is superior in balance between the impact resistance, moldability and stiffness.

The thermoplastic resin composition of the present invention can be prepared, for example, by the method of weighing each predetermined amount of a powdered, beads-like or pelletized thermoplastic resin (F), a graft copolymer (G) and other graft copolymer (S), mixing them, and melting and kneading the mixture. In case of melting and kneading, a kneader such as Banbury mixer, pressure kneader, roll or the like is employed. The graft copolymer (G) and the thermoplastic resin composition containing the same can be fed as raw materials of the molded article as they are. If necessary, dyes, pigments, stabilizers, reinforcers, fillers, flame retardants, blowing agents, lubricants, plasticizers, and antistatic agents can be incorporated into the thermoplastic resin composition. A desired molded article can be obtained from the graft copolymer (G) and the thermoplastic resin composition containing the same by various molding methods such as injection molding method, extrusion molding method, blow molding method, compression molding method, calendering method, inflation molding and the like.

The thermoplastic resin composition containing the graft copolymer (G) of the present invention can be used in various molded articles and examples of industrial uses thereof include vehicle parts; building material parts such as exterior and interior parts, wall material, and window channeling which are used without being coated; dish and toy; electric appliances such as cleaner housing, television housing, and air-conditioner housing; interior members; vessel members and communications equipment housing; and electric appliance housings such as housing for note type personal computer, PDA housing, and housing for liquid crystal projector.

EXAMPLES

The following Examples and Comparative Examples further illustrate the present invention in detail but are not to be construed to limit the scope thereof unless they do not depart the gist thereof.

In the following Examples, percentages and parts are by weight unless otherwise stated. Various physical properties in the following Examples and Comparative Examples were determined by the following procedures.

(1) Weight-average Particle Diameter and Weight Proportion of Particles Having a Particle Diameter of Less than 100 nm of Rubber Polymer in Latex.

They were measured by using a submicron particle size distribution measuring device "CHDF-2000" manufactured by MATEC APPLIED SCIENCES.

(2) Amount of Emulsifier Residue in Graft Copolymer

An emulsifier residue contained in a graft copolymer was methylesterified in an acetone solvent using methanol and hydrochloric acid, and then filtered. The residue obtained by removing the solvent in the filtrate under reduced pressure was dissolved in normal hexane, washed with water, and then the amount of the emulsifier residue was determined by quantitative analysis using gas chromatography ("GC-14B", manufactured by Shimadzu Corporation).

(3) Measurement of Temperature at which 1% Weight Loss of Graft Copolymer Arise

Using "TG/DTA, Model 200" manufactured by Seiko Instruments Co., Ltd., it was measured under the heating conditions of 20° C./minute.

Reference Example 1

Preparation of Butadiene Polymer Latex (B-1)

The following respective components were charged in a stainless steel autoclave equipped with a stirrer and a thermometer.

| | |
|---|---|
| Deionized water (hereinafter abbreviated to water) | 145 Parts |
| Heterogeneous potassium rosinate | 1.0 Parts |
| Potassium oleate | 1.0 Parts |
| Sodium formaldehyde sulfoxylate dihydrate | 0.4 Parts |
| Anhydrous sodium sulfate | 0.1 Parts |
| Tertiary dodecylmercaptan | 0.3 Parts |
| Diisoopropylbenzene hydroperoxide | 0.5 Parts |
| 1,3-butadiene | 26.2 Parts |
| Styrene | 1.4 Parts |

After heating to the inner temperature of 50° C., an aqueous solution of 0.5 parts of sodium pyrophosphate, 0.005 parts of ferrous sulfate heptahydrate and 5 parts of water were added and the polymerization was initiated. A mixture of 68.6 parts of 1,3-butadiene and 3.6 parts of styrene was added dropwise at the polymerization temperature of 57° C. by using a pressure pump. Then, 0.3 parts of normal dodecylmercaptan was added at the point of time at which the polymerization conversion ratio reached 40%, and the polymerization was continued furthermore. After eight hours, the remained 1,3-butadiene was removed to obtain a butadiene polymer latex (B-1) having a solid content of 40.2%, a polymerization conversion rate of 97% and a weight-average particle diameter of 70 nm.

Reference Example 2

Preparation of Acid Group-containing Copolymer (K-1) for Particle-enlarging

The following respective components were charged in a glass reaction vessel equipped with a reagent injecting container, a cooling tube, a jacket heater and a stirrer (hereinafter abbreviated to a glass reaction vessel) and then heated to the inner temperature of 65° C. while stirring.

| | |
|---|---|
| Potassium oleate | 2.2 Parts |
| Sodium dioctylsulfosuccinate | 2.5 Parts |
| Sodium formaldehyde sulfoxylate dihydrate | 0.3 Parts |
| Ferrous sulfate heptahydrate | 0.003 Parts |
| Disodium ethylenediaminetetraacetate | 0.009 Parts |
| Deionized water | 200 Parts |

To the mixed solution, a mixture of 81.5 parts of n-butyl acrylate, 18.5 parts of methacrylic acid and 0.5 parts of cumene hydroperoxide was added dropwise over two hours. Even after the completion of the dropwise addition, the polymerization was continued at the same temperature for two hours. Consequently, an acid group-containing copolymer latex for particle-enlarging (K-1) having a polymerization conversion rate of 98% and a weight-average particle diameter of 150 nm was obtained.

Reference Example 3

Preparation of Acid Group-containing Copolymer (K-2) for Particle-enlarging

In the same manner as in the preparation of the acid group-containing polymer (K-1) for particle-enlarging of Reference Example 2, except that the amount of n-butyl acrylate was replaced by 85.0 parts of n-butyl and the amount of methacrylic acid was replaced by 15.0 parts, an acid group-containing copolymer latex for particle-enlarging (K-2) having a weight-average particle diameter of 120 nm was prepared.

Reference Example 4

Preparation of Acid Group-containing Copolymer (K-3) for Particle-enlarging

In the same manner as in the preparation of the acid group-containing polymer (K-1) for particle-enlarging of Reference Example 2, except that the amount of n-butylacrylate was replaced by 79.0 parts of n-butyl and the amount of methacrylic acid was replaced by 21.0 parts, an acid group-containing copolymer latex for particle-enlarging (K-3) having a weight-average particle diameter of 165 nm was prepared.

Example 1

Preparation of Graft Copolymer (G-1)

To 100 parts of the butadiene polymer latex (B-1, solid content) prepared in Reference Example 1, 2.1 parts of acid group-containing copolymer (K-1) for particle-enlarging prepared in Reference Example 2 (as solid content) was added while stirring at room temperature, followed by continuous stirring for additional 30 minutes to obtain a enlarged butadiene polymer latex. The weight-average particle diameter of the butadiene polymer after particle-enlarging was 380 nm.

In a glass reaction vessel, 10 parts of an enlarged butadiene polymer latex (as solid content), 0.3 parts of dipotassium alkenylsucininate ("LATEMUL ASK" manufactured by Kao Corp., as actual amount, same rule applies correspondingly to the followings) and 175 parts of water (including water in the enlarged butadiene polymer latex) were charged. Under stirring, 40 parts of n-butyl acrylate, 0.16 parts of allyl methacrylate, a mixture of 0.08 parts of 1,3-butylene glycol dimethacrylate and 0.1 parts of tertiary butyl hydroperoxide was then added.

The atmosphere was replaced by nitrogen by passing a nitrogen flow through the reaction vessel, and then heated to 60° C. At the point of time at which the liquid temperature in the reaction vessel reached 50° C., an aqueous solution of 0.00015 parts of ferrous sulfate heptahydrate, 0.00045 parts of disodium ethylenediaminetetraacetate, 0.24 parts of Rongalite and 5.0 parts of water was added and the inner temperature was raised to 75° C., thereby initiating the radical polymerization. This state was maintained for one hour, thereby completing the polymerization of the acrylate component to obtain a latex of a composite rubber polymer of an enlarged butadiene polymer and a n-butyl acrylate rubber. The weight-average particle diameter measured by using a small amount of this composite rubber polymer latex sampled was 300 nm and the proportion of the particles having a particle diameter of 100 nm or less was 8% based on the total weight.

An aqueous solution of 0.15 parts of Rongalite, 0.65 parts of dipotassium alkenylsuccinate and 10 parts of water was added, and then a mixed solution of 6.3 parts of acrylonitrile, 18.7 parts of styrene and 0.11 parts of tertiary butyl hydroperoxide was added dropwise over one hour and the mixed solution was polymerized. After five minutes have been passed since the completion of the dropwise addition, an aqueous solution prepared from 0.001 parts of ferrous sulfate heptahydrate, 0.003 parts of disodium ethylenediaminetetraacetate, 0.15 parts of Rongalite and 5 parts of water was added and a mixed solution of 6.3 parts of acrylonitrile, 18.7 parts of styrene, 0.19 parts of tertiary butyl hydroperoxide and 0.014 parts of normal octylmercaptan was added dropwise over one hour and the mixed solution was polymerized. After the completion of the dropwise addition, the state at a temperature of 75° C. was maintained for 10 minutes, followed by cooling. At the point of time at which the inner temperature reached 60° C., a dispersion of 0.2 parts of an antioxidant ("ANTAGE W500", manufactured by Kawaguchi Chemical Industries Co., Ltd.), 0.2 parts of dipotassium alkenylsuccinate and 5 parts of water was added. The above operation gave a latex of a graft copolymer obtained by graft copolymerization of a composite rubber polymer of an enlarged butadiene polymer and a n-butyl acrylate rubber, and acrylonitrile/styrene.

Then, the above polymer latex was charged in a 1.2-fold amount of an aqueous 0.6% sulfuric acid solution heated to 45° C. while stirring, thereby coagulate a polymer. After the liquid temperature was raised to 65° C. and maintained for five minutes, the liquid temperature was raised to 90° C. The coaglum was separated, and then the recovered product was subjected to a washing treatment by charging in a 10-fold amount of water and stirring for 10 minutes. This dispersion was dehydrated in a centrifugal drier and then dried at 80° C. for 16 hours to obtain a graft copolymer (G-1).

The measurement results of the amount of the emulsifier residue in the graft copolymer (G-1) and those of 1% weight loss obtained by measuring TG-DTA under the conditions of 20° C./minute are shown in Table 1.

Example 2

Preparation of Graft Copolymer (G-2)

In the same manner as in the procedure for preparation of the graft copolymer (G-1) of Example 1, except that the amount of dipotassium alkenylsuccinate to be added together with the enlarged butadiene polymer latex was changed to 0.9 parts from 0.3 parts and the amount of dipotassium alkenylsuccinate to be added to the composite rubber polymer latex was changed to 0.05 parts from 0.65 parts, a graft copolymer (G-2) was prepared.

The measurement results of the amount of the emulsifier residue in the graft copolymer (G-2) and those of 1% weight loss obtained by measuring TG-DTA under the conditions of 20° C./minute are shown in Table 1.

Example 3

Preparation of Graft Copolymer (G-3)

In the same manner as in the procedure for preparation of the graft copolymer (G-1) of Example 1, except that the amount of dipotassium alkenylsuccinate to be added together with the enlarged butadiene polymer latex was changed to 0 parts from 0.3 parts and the amount of dipotassium alkenylsuccinate to be added to the composite rubber polymer latex was changed to 0.95 parts from 0.65 parts, a graft copolymer (G-3) was prepared. The results are shown in Table 1.

The measurement results of the amount of the emulsifier residue in the graft copolymer (G-3) and those of 1% weight loss obtained by measuring TG-DTA under the conditions of 20° C./minute are shown in Table 1.

Example 4

Preparation of Graft Copolymer (G-4)

In the same manner as in the procedure for preparation of the graft copolymer (G-1) of Example 1, except that the acid group-containing copolymer latex (K-1) was replaced by (K-2), a graft copolymer (G-4) was prepared.

The measurement results of the amount of the emulsifier residue in the graft copolymer (G-4) and those of 1% weight loss obtained by measuring TG-DTA under the conditions of 20° C./minute are shown in Table 1.

Example 5

Preparation of Graft Copolymer (G-5)

In the same manner as in the procedure for preparation of the graft copolymer (G-1) of Example 1, except that the acid group-containing copolymer latex (K-1) was replaced by (K-3), a graft copolymer (G-5) was prepared.

The measurement results of the amount of the emulsifier residue in the graft copolymer (G-5) and those of 1% weight loss obtained by measuring TG-DTA under the conditions of 20° C./minute are shown in Table 1.

Example 6

Preparation of Graft Copolymer (G-6)

In the same manner as in the procedure for preparation of the graft copolymer (G-1) of Example 1, except that the amount of the enlarged butadiene polymer was changed to 5 parts (solid content) and each amount of n-butyl acrylate, allyl methacrylate and 1,3-butylene glycol dimethacrylate, which constitute the acrylic rubber, is changed to 45 parts, 0.18 parts and 0.1 parts, respectively, a graft copolymer (G-6) was prepared.

The measurement results of the amount of the emulsifier residue in the graft copolymer (G-6) and those of 1% weight loss obtained by measuring TG-DTA under the conditions of 20° C./minute are shown in Table 1.

Example 7

Preparation of Graft Copolymer (G-7)

In the same manner as in the procedure for preparation of the graft copolymer (G-1) of Example 1, except that the amount of the enlarged butadiene polymer was changed to 20 parts (solid content) and each amount of n-butyl acrylate, allyl methacrylate and 1,3-butylene glycol dimethacrylate, which constitute the acrylic rubber, is changed to 30 parts, 0.12 parts and 0.06 parts, respectively, a graft copolymer (G-7) was prepared.

The measurement results of the amount of the emulsifier residue in the graft copolymer (G-7) and those of 1% weight loss obtained by measuring TG-DTA under the conditions of 20° C./minute are shown in Table 1.

Comparative Example 1

Preparation of Graft Copolymer (H-1)

In the same manner as in the procedure for preparation of the graft copolymer (G-1) of Example 1, except that the amount of dipotassium alkenylsuccinate to be added to the composite rubber polymer latex was changed to 2.0 parts from 0.65 parts, a graft copolymer (H-1) was prepared.

The measurement results of the amount of the emulsifier residue in the graft copolymer (H-1) and those of 1% weight loss obtained by measuring TG-DTA under the conditions of 20° C./minute are shown in Table 1.

Comparative Example 2

Preparation of Graft Copolymer (H-2)

In the same manner as in the procedure for preparation of the graft copolymer (G-1) of Example 1, except that the amount of dipotassium alkenylsuccinate to be added to the composite rubber polymer latex was changed to 0.05 parts from 0.65 parts, a graft copolymer (H-2) was prepared.

The measurement results of the amount of the emulsifier residue in the graft copolymer (H-2) and those of 1% weight loss obtained by measuring TG-DTA under the conditions of 20° C./minute are shown in Table 1.

TABLE 1

|  | Example 1 | Example 2 | Example 3 | Example 4 | Example 5 | Example 6 | Example 7 | Comp. Example 1 | Comp. Example 2 |
|---|---|---|---|---|---|---|---|---|---|
| Types of graft copolymer | G-1 | G-2 | G-3 | G-4 | G-5 | G-6 | G-7 | H-1 | H-2 |
| Weight-average particle diameter of butadiene polymer after particle-enlarging (nm) | 380 | 380 | 380 | 330 | 420 | 380 | 380 | 380 | 380 |
| Composite rubber polymer |  |  |  |  |  |  |  |  |  |
| Proportion of butadiene component (% by weight) | 20 | 20 | 20 | 20 | 20 | 10 | 40 | 20 | 20 |
| Weight-average particle diameter (nm) | 300 | 285 | 327 | 334 | 310 | 278 | 330 | 300 | 300 |
| Proportion of particles having a particle diameter less than 100 nm (% by weight) | 8 | 21 | 3 | 6 | 12 | 16 | 4 | 9 | 11 |

TABLE 1-continued

|  | Example 1 | Example 2 | Example 3 | Example 4 | Example 5 | Example 6 | Example 7 | Comp. Example 1 | Comp. Example 2 |
|---|---|---|---|---|---|---|---|---|---|
| Parts*1 of emulsifier relative to graft copolymer (G) | | | | | | | | | |
| ① (parts by weight) | 0.3 | 0.9 | 0.0 | 0.3 | 0.3 | 0.3 | 0.3 | 0.3 | 0.3 |
| ② (parts by weight) | 0.65 | 0.05 | 0.95 | 0.65 | 0.65 | 0.65 | 0.65 | 2.0 | 0.05 |
| ③ (parts by weight) | 0.2 | 0.2 | 0.2 | 0.2 | 0.2 | 0.2 | 0.2 | 0.2 | 0.2 |
| Amount of emulsifier residue (% by weight) | 1.3 | 1.5 | 1.4 | 1.4 | 1.3 | 1.2 | 1.7 | 2.3 | 0.4 |
| 1% weight loss temperature (° C.) | 320 | 319 | 321 | 322 | 316 | 316 | 309 | 273 | 330 |

① added before preparation of composite rubber polymer
② added after preparation of composite rubber polymer
③ added after cooling
*1Parts relative to 100 parts by weight of graft copolymer Reference Example 5

Preparation of ABS Resin (S-1)

In a glass reaction vessel, 48.9 parts of a butadiene polymer latex (B-1, as a solid content) was charged (at room temperature), and then 1.1 parts of an acid group-containing copolymer latex (K-2, solid content) was charged under stirring. Subsequently, the mixture was stirred at room temperature for 60 minutes to obtain an enlarged butadiene rubber polymer latex having a weight-average particle diameter of 330 nm and a solid content of 39.9%.

To this enlarged butadiene rubber polymer latex, 140 parts of water (including water contained in the rubber polymer latex), 0.6 parts of fructose, 0.01 parts of sodium phosphoric anhydride, 0.005 parts of ferrous sulfate heptahydrate and 0.1 parts of sodium hydroxide were added, and then the atmosphere was replaced by nitrogen under stirring and heated to 50° C. To the mixture, a mixture of 15 parts of acrylonitrile, 35 parts of styrene, 0.5 parts of t-dodecylmercaptan and 0.3 parts of cumene hydroperoxide was added dropwise over 180 minutes and the inner temperature was controlled so that it does not exceed 65° C. during the dropwise addition. After the completion of the dropwise addition, 0.12 parts of cumene hydroperoxide was added and, furthermore, the mixture was maintained for one hour and cooled. To the resulting latex, 1 part of an antioxidant ("ANTAGE W400", manufactured by Kawaguchi Chemical Industries Co., Ltd.) was added and the latex was poured into an aqueous 1.2% sulfuric acid solution (70° C.) in the same amount as that of this graft polymer latex, thereby to cause coagulation. A butadiene graft polymer (ABS resin, S-1) was obtained as a milk white powder by heating to 90° C. and maintaining for five minutes, followed by dehydration, washing and further drying.

Reference Example 6

Ethylene-propylene-non-conjugated Diene Rubber Graft Copolymer

As an ethylene-propylene-non-conjugated diene rubber graft copolymer, an AES resin "W220" manufactured by Techno Polymer Co. was employed.

Reference Example 7

Preparation of Polyorganosiloxane (L-1)

98 Parts of octamethylcyclotetrasiloxane and 2 parts of γ-methacryloyloxypropyldimethoxymethylsilane were mixed to obtain 100 parts of a siloxane mixture. To the siloxane mixture, a solution prepared by dissolving 0.67 parts of sodium dodecylbenzenesulfonate in 300 parts of deionized water was added and, after stirring in a homomixer at 10000 rpm for two minutes, the mixture was once passed through a homogenizer at a pressure of 200 kg/cm$^2$ to obtain a stable premixed organosiloxane latex.

On the other hand, in a reaction vessel equipped with a reagent injecting container, a cooling tube, a jacket heater and a stirrer, 10 parts of dodecylbenzenesulfonic acid and 90 parts of water were charged to prepare an aqueous 10% dodecylbenzenesulfonic acid solution.

In the state where this aqueous solution is heated to 85° C., the premixed organosiloxane latex was added dropwise over four hours. After the completion of the dropwise addition, the temperature was maintained for one hour and then lowered. Then, the reaction product was neutralized by adjusting the pH to 7 using an aqueous sodium hydroxide solution.

The polyorganosiloxane (L-1) latex thus obtained was dried at 170° C. for 30 minutes and the solid content was determined. As a result, it was 17.7%. The weight-average particle diameter of the polyorganosiloxane (L-1) in the latex was 50 nm.

Reference Example 8

Preparation of Graft Copolymer (S-3a)

In a glass reaction vessel, 8.0 parts of the polyorganosiloxane (L-1) latex (solid content) prepared in Reference Example 7, 0.2 parts of "EMAL NC-35" (polyoxyethylene alkyl phenyl ether sulfate, manufactured by Kao Corp.) and 200 parts of water were mixed, and then a mixture of 42 parts of n-butyl acrylate, 0.3 parts of allyl methacrylate, 0.1 parts of 1,3-butylene glycol dimethacrylate and 0.11 parts of t-butyl hydroperoxide was added.

The atmosphere was replaced by nitrogen by passing a nitrogen flow through this reaction vessel while stirring, and then heated to 60° C. At the point of time at which the liquid temperature in the reaction vessel reached 60° C., an aqueous solution of 0.000075 parts of ferrous sulfate, 0.000225 parts of disodium ethylenediaminetetraacetate, 0.2 parts of Rongalite and 10 parts of water was added, thereby initiating the radical polymerization. The liquid temperature was raised to 78° C. by the polymerization of the acrylate component. This state was maintained for one hour, thereby completing the polymerization of the acrylate component to obtain a latex of a composite rubber polymer of an polyorganosiloxane and a n-butyl acrylate rubber.

After the liquid temperature in the reaction vessel was lowered to 70° C., an aqueous solution of 0.25 parts of Rongalite and 10 parts of water was added, and then a mixed solution of 2.5 parts of acrylonitrile, 7.5 parts of styrene and 0.05 parts of t-butyl hydroperoxide was added dropwise over two hours and the mixed solution was polymerized. After the completion of the dropwise addition, the state at a temperature of 60° C. was maintained for one hour and an aqueous solution of 0.001 parts of ferrous sulfate, 0.003 parts of disodium ethylenediaminetetraacetate, 0.2 parts of Rongalite, 0.2 parts of "EMAL NC-35" (manufactured by Kao Corp.) and 10 parts of water was added and a mixed solution of 10 parts of acrylonitrile, 30 parts of styrene and 0.2 parts of t-butyl hydroperoxide was added dropwise over two hours and the mixed solution was polymerized. After the completion of the dropwise addition, the state at a temperature of 60° C. was maintained for 0.5 hours and 0.05 parts of cumene hydroperoxide was added. Furthermore, the state at a temperature of 60° C. was maintained for 0.5 hours, followed by cooling. To this latex, 0.5 parts of dipotassium alkenylsuccinate was added to obtain a latex of a graft copolymer (S-3a) obtained by graft copolymerization of a composite rubber polymer of polyorganosiloxane (L-1) and a n-butyl acrylate rubber, and acrylonitrile/styrene.

Then, 150 parts of an aqueous solution prepared by dissolving calcium acetate in a proportion of 1% was heated to 60° C. and stirred. In this solution, 100 parts of a latex of a graft copolymer (S-3a) was added dropwise, gradually, thereby coagulate the solution. The deposit was separated, washed, and then dehydrated for two minutes, and then dried over 24 hours at a temperature of 85° C. to obtain a graft copolymer (S-3a).

Reference 9

Preparation of Polyorganosiloxane (L-2) Latex 97.5 Parts of octamethylcyclotetrasiloxane, 0.5 parts of γ-methacryloyloxypropyldimethoxymethylsilane and 2 parts of tetraethoxysilane were mixed to obtain 100 parts of a siloxane mixture. To the siloxane mixture, an aqueous solution of 1 part of dodecylbenzenesulfonic acid, 1 part of sodium dodecylbenzenesulfonate and 200 parts of water was added and, after stirring in a homomixer at 10000 rpm for two minutes, the mixture was once passed through a homogenizer at a pressure of 200 kg/cm$^2$ to obtain a stable premixed organosiloxane latex.

This premixed organosiloxane latex was charged in a glass reaction vessel, heated at 80° C. for five hours while mixing with stirring, cooled to about 20° C., and then allowed to stand for 48 hours. The reaction product was neutralized by adjusting the pH to 7 using an aqueous caustic soda solution, thereby completing the polymerization.

The polyorganosiloxane (L-2) latex thus obtained was dried at 170° C. for 30 minutes and the solid content was determined. As a result, it was 36.5%. The weight-average particle diameter of the polyorganosiloxane (L-2) in the latex was 160 nm.

Reference Example 10

Preparation of Graft Copolymer (S-3b)

In a reaction vessel equipped with a reagent injecting container, a cooling tube, a jacket heater and a stirrer, 30 parts of the polyorganosiloxane (L-2) latex (solid content) prepared in Reference Example 6 and 295 parts of water were mixed. After the atmosphere was replaced by nitrogen and heated to 50° C., a mixture of 37.5 parts of n-butyl acrylate, 2.5 parts of allyl methacrylate and 0.3 parts of t-butyl hydroperoxide was added, followed by stirring at room temperature for 30 minutes. Then, an aqueous solution of 0.0003 parts of ferrous sulfate pentahydrate, 0.001 parts of disodium ethylenediaminetetraacetate, 0.17 parts of Rongalite and 5 parts of deionized water was added, thereby initiating the radical polymerization. The polymerization was maintained at the inner temperature of 70° C. for two hours, thereby completing the polymerization of the acrylate component to obtain a latex of a composite rubber polymer. This latex was partially collected and the weight-average particle diameter of the composite rubber polymer was measured. As a result, it was 190 nm.

To this composite rubber polymer latex, a mixture of 9 parts of acrylonitrile, 21 parts of styrene and 0.3 parts of t-butyl hydroperoxide was added dropwise at the inner temperature of 70° C. over 45 minutes. Then, this state was maintained at 70° C. for four hours, thereby completing the graft polymerization.

This graft copolymer (S-3b) latex was charged in the same amount an aqueous calcium chloride solution at 60° C. while stirring, and then coagulated by maintaining at 80° C. for five minutes, then at 95° C. for five minutes. The deposit was separated, washed, centrifuged and then dried at 85° C. for 24 hours to obtain a graft copolymer (S-3b).

Reference Example 11

Preparation of Other Thermoplastic Resin (F-1)

An acryloniterile-styrene copolymer (F-1) comprising 29 parts of acrylronitrile and 71 parts of styrene, in which a reducing viscosity measured in a N,N-dimethylformaide solution at 25° C. is 0.60 dl/g, was prepared by a conventional suspension polymerization method.

Reference Example 12

Preparation of Other Thermoplastic Resin (F-2)

An acryloniterile-styrene-N-phenylmaleimide terpolymer (F-2) comprising 20 parts of acrylronitrile, 53 parts of styrene and 27 parts of N-phenylmaleimide, in which a reducing viscosity measured in a N,N-dimethylformaide solution at 25° C. is 0.65 dl/g, was prepared by a conventional continuous solution polymerization method.

Reference Example 13

Preparation of Other Thermoplastic Resin (F-3)

An acryloniterile-styrene-glycidyl methacrylate terpolymer (F-3) having an epoxy group, comprising 25 parts of acrylronitrile, 74.6 parts of styrene and 0.4 parts of glycidyl methacrylate, in which a reducing viscosity measured in a N,N-dimethylformaide solution at 25° C. is 0.50 dl/g, was prepared by a conventional suspension polymerization method.

Reference Example 14

Preparation of Other Thermoplastic Resin (F-4)

An acryloniterile-styrene-methyl methacrylate terpolymer (F-4) comprising 7 parts of acrylronitrile, 23 parts of styrene and 70 parts of methyl methacrylate, in which a reducing viscosity measured in a N,N-dimethylformaide solution at 25° C. is 0.38 dl/g, was prepared by a conventional suspension polymerization method.

Reference Example 15

Preparation of Other Thermoplastic Resin (F-5)

An acrylic resin (F-5) comprising 99 parts of methyl methacrylate and 1 part of methyl acrylate, in which a reducing viscosity measured in a N,N-dimethylformaide solution at 25° C. is 0.25 dl/g, was prepared by a conventional suspension polymerization method.

Reference Example 16

Preparation of Other Thermoplastic Resins (F-6) to (F-9)

As a polycarbonate resin (F-6), "IUPILON S2000F" manufactured by Mitsubishi Engineering-Plastics Corporation was employed. As a polyester resin (F-7), "TUFPET N1300" manufactured by Mitsubishi Rayon Co., Ltd. was employed. As an ultrahigh-molecular acrylic resin (F-8), "METABLEN P-531 " manufactured by Mitsubishi Rayon Co., Ltd. was employed. As a vinyl chloride resin (F-9), "TK-1000" (polymerization degree: 1,000) manufactured by Shin-Etsu Chemical Co., Ltd. was employed.

Examples 8 to 86 and Comparative Examples 3 to 27

Preparation of Thermoplastic Resin Compositions and Evaluation of Performances

The respective graft copolymers (G-1 to G-7, H-1 and H-2) prepared in Examples 1 to 7 and Comparative Examples 1 and 2 and, if necessary, other graft copolymers (S-1, 2, 3a and 3b), other thermoplastic resins (F-1 to F-9), 0.3 parts of "ADEKA STAB C" manufactured by Asahi Denka Kogyo K.K., 0.3 parts of barium stearate, 0.4 parts of ethylenebisstearylamide and 0.8 parts of carbon black ("#960", manufactured by Mitsubishi Chemical Corporation) were mixed by using a Henschel mixer and the resulting mixture was fed into an deaeration type extruder ("PCM-30", manufactured by Ikegai Tekko Corporation) heated to a temperature within a range of 230–260° C., and then kneaded to obtain pellets.

As the bromine flame retardant, one terminal-modified tetrabromo bisphenol A ("SR-T104N", manufactured by Sakamoto Yakuhin Kogyo Co., Ltd.) was employed. As the antimony compound, antimony trioxide was employed. As the chlorinated polyethylene, "E-230" manufactured by Daiso Co., Ltd. was employed. As the polytetrafluoroethylene, "F201L" manufactured by Daikin Industries, Ltd. was employed. As the silicone oil, "SH-200" manufactured by Toray Dow Corning Co., Ltd. was employed. As the phosphorous flame retardant, triphenyl phosphate and red phosphorous were employed. As the glass fiber, "ECSO3T-34" manufactured by Nippon Electric Glass Co., Ltd. was employed. As the carbon fiber, "PYROFIL TR-06U" manufactured by Mitsubishi Rayon Co., Ltd. was employed. As the talc, "MICROTALC MP10-52" manufactured by Pfizer MSP K.K. was employed. As the wollastonite, "NYGROS8" manufactured by Tomoe Engineering Co., Ltd. was employed. As the mica, "WG325" manufactured by Hayashi Kasei, Ltd. was employed.

The evaluation results of MI, gloss of molding, pigmentation properties, Izod impact strength, Rockwell hardness, gas evolution during the molding, weather resistance, flame retardancy, short shot pressure, drawdown properties during the extrusion, and linear expansion coefficient, which were measured by using the resulting pellets, are shown in Tables 2 to 16.

These properties were evaluated by the following procedures.

(4) Melt Flow Rate (MI)

It was measured by the method defined in ASTM D1238 under the conditions of a barrel temperature of 200° C. and a loading of 49 N or a barrel temperature of 220° C. and a loading of 98 N.

(5) Gloss of Thermoplastic Resin Composition

Using an injection molder "J85-ELII" manufactured by Nippon Seikosho Co., Ltd., a plate of 100 mm×100 mm×3 mm in size was molded under the conditions of a cylinder setting temperature of 230° C. or 280° C., a mold temperature of 60° C. and an injection speed of 50%. Gloss of the resulting molded plate was measured by using a gloss meter "GM-26D" manufactured by Murakami Shikisai Kenkyusho Co., Ltd.

(6) Evaluation of Pigmentation of Thermoplastic Resin Composition

Using an injection molder "J85-ELII" manufactured by Nippon Seikosho Co., Ltd., a plate of 100 mm×100 mm×3 mm in size was molded under the conditions of a cylinder setting temperature of 230° C., a mold temperature of 60° C. and an injection speed of 50%. Color hue of the resulting black-colored molded plate was measured (measurement of L*) by using a high-speed spectrophotometer "CMS-1500" manufactured by Murakami Shikisai Kenkyusho Co., Ltd. in accordance with JIS Z8729.

(7) Measurement of Izod Impact Test

It was measured by the method defined in ASTM D256. The Izod impact strength under a low temperature atmosphere was measured after leaving Izod specimens under an atmosphere at −30° C. for 12 hours or more.

(8) Measurement of Surface Hardness (Rockwell Hardness)

It was measured by the method defined in ASTM D785.

(9) Evaluation of Gas Evolution During Molding

Using an injection molder "J85-ELII" manufactured by Nippon Seikosho Co., Ltd., the amount of smoke evolved during the flow of a molten resin under the conditions of a cylinder setting temperature of 280° C. and an injection speed of 50% was visually observed. Criteria for judgment are as follows.

○: Small amount of smoke
Δ: Medium amount of smoke
X: Large amount of smoke

(10) Evaluation of Weather Resistance

A white-colored plate of 100 mm×100 mm×3 mm in size was treated by using a Sunshine Weather-Ometer (manufactured by Suga Test Instrument Co., Ltd.) at a black panel temperature of 63° C. and cycle conditions of 60 minutes (rainfall: 12 minutes) for 600 hours. The results were evaluated by the degree of color change (ΔE) measured by a color difference meter.

(11) Short Shot Pressure

Using a horizontal molder "M-100" manufactured by Meiki Co., Ltd., a minimum pressure enough to mold into a plate of 100 mm×100 mm×3 mm in size at a cylinder temperature of 240° C. was indicated by percentage (%) based on a maximum pressure (2,000 kgf/cm$^2$) as an index of the fluidity of the thermoplastic resin composition.

(12) Evaluation of Flame Retardancy

Using an injection molder "SAV-60" manufactured by Sanjo Seiki Co., Ltd., a test piece of $\frac{1}{16}$ inch in thickness was made under the conditions of a cylinder setting temperature within a range of 200–250° C. and a mold temperature of 60° C., and then the drip initiation time was measured by continuously bringing this specimen closer to flame in accordance with a vertical test defined in UL-94 Standard until drip occurs, thus deciding UL-94 grade.

(13) Evaluation of Drawdown

Using a 30 mm uniaxial extruder ("Laboplaskomill", manufactured by Toyo Seiki Co., Ltd.) set at a barrel temperature of 210° C., a square bar was extruded at a screw speed of 30 rpm and then the resin's deflection width between an extruder die and a sizing die was measured. Specimens where the amount is 1 mm or less were rated ○, while specimens where the amount is 1 mm or more were rated X.

(14) Linear Expansion Coefficient

Using specimens obtained by cutting out the above square bar, it was measured by a thermomechanical analyzer "TMA-100" manufactured by Seiko Instruments Co., Ltd. Specimens where an average linear expansion coefficient at a temperature within a range of −30 to +60° C. is $6.5 \times 10^{-5}$ m/m/° C. or less were rated ○, while specimens where an average linear expansion coefficient at a temperature within a range of −30 to +60° C. exceeds $6.5 \times 10^{-5}$ m/m/° C. were rated X.

TABLE 2

|  |  | Example 8 | Example 9 | Example 10 | Example 11 | Example 12 | Example 13 | Example 14 |
|---|---|---|---|---|---|---|---|---|
| Graft copolymer (parts by weight) | (G) | G-1<br>48 | G-2<br>48 | G-3<br>48 | G-4<br>48 | G-5<br>48 | G-6<br>48 | G-7<br>48 |
|  | (H) |  |  |  |  |  |  |  |
|  | (S) |  |  |  |  |  |  |  |
| Other thermoplastic resin (parts by weight) | (F-1) | 52 | 52 | 52 | 52 | 52 | 52 | 52 |
| MI*1 | (g/10 min) | 1.5 | 1.4 | 1.5 | 1.7 | 1.4 | 1.5 | 1.7 |
| Gloss of molding |  |  |  |  |  |  |  |  |
| Molding at 230° C. | (%) | 92 | 91 | 91 | 89 | 92 | 90 | 92 |
| Molding at 280° C. | (%) | 80 | 50 | 83 | 81 | 69 | 66 | 79 |
| Pigmentation (L*) |  | 12.2 | 11.8 | 12.8 | 13.3 | 11.6 | 13.0 | 12.0 |
| Izod impact strength*2 |  |  |  |  |  |  |  |  |
| measured at 23° C. | (J/m) | 265 | 270 | 200 | 245 | 250 | 235 | 240 |
| measured at −30° C. | (J/m) | 90 | 92 | 75 | 73 | 91 | 72 | 96 |
| Rockwell hardness (R scale) |  | 94 | 92 | 94 | 93 | 92 | 93 | 93 |
| Molding gas evolution (280° C.) |  | ○ | ○ | ○ | ○ | ○ | ○ | ○–Δ |
| Weather resistance ΔE |  | 2.4 | 2.6 | 2.1 | 2.8 | 2.0 | 1.6 | 3.8 |

*1MI was measured at 200° C. under loading of 49 N (5 kgf)
*2Izod specimen has a thickness of ¼ inch

TABLE 3

|  |  | Example 15 | Example 16 | Example 17 | Example 18 | Example 19 | Comp. Example 3 | Comp. Example 4 |
|---|---|---|---|---|---|---|---|---|
| Graft copolymer (parts by weight) | (G) | G-1<br>36 | G-1<br>24 | G-1<br>36 | G-1<br>24 | G-1<br>30 |  |  |
|  | (H) |  |  |  |  |  | H-1<br>48 | H-1<br>48 |
|  | (S) | S-1<br>12 | S-2<br>50 | S-2<br>25 | S-3a<br>24 | S-3a<br>18 |  |  |
| Other thermoplastic resin (parts by weight) | (F-1) | 52 | 26 | 39 | 52 | 52 | 52 | 52 |
| MI*1 | (g/10 min) | 1.8 | 1.2 | 1.2 | 1.3 | 1.1 | 1.5 | 0.9 |
| Gloss of molding |  |  |  |  |  |  |  |  |
| Molding at 230° C. | (%) | 93 | 80 | 90 | 95 | 95 | 92 | 92 |
| Molding at 280° C. | (%) | 84 | 68 | 75 | 69 | 73 | 38 | 81 |
| Pigmentation (L*) |  | 10.2 | 11.1 | 11.8 | 9.5 | 10.4 | 12.3 | 12.1 |
| Izod impact strength*2 |  |  |  |  |  |  |  |  |
| Measured at 23° C. | (J/m) | 320 | 298 | 285 | 330 | 300 | 260 | 255 |
| Measured at −30° C. | (J/m) | 111 | 135 | 120 | 68 | 95 | 89 | 88 |
| Rockwell hardness (R scale) |  | 93 | 93 | 94 | 93 | 94 | 94 | 94 |
| Molding gas evolution (280° C.) |  | ○–Δ | ○–Δ | ○ | ○ | ○ | x | ○ |
| Weather resistance ΔE |  | 4.5 | 2.8 | 2.6 | 1.7 | 2.3 | 2.3 | 2.8 |

*1MI was measured at 200° C. under loading of 49 N (5 kgf)
*2Izod specimen has a thickness of ¼ inch

TABLE 4

|  |  | Example 20 | Example 21 | Example 22 | Example 23 | Example 24 | Comp. Example 5 | Comp. Example 6 |
|---|---|---|---|---|---|---|---|---|
| Graft copolymer (parts by weight) | (G) | G-1<br>40 | G-2<br>40 | G-3<br>40 | G-1<br>20 | G-1<br>20 |  |  |
|  | (H) |  |  |  |  |  | H-1<br>40 | H-2<br>40 |

TABLE 4-continued

|  |  | Example 20 | Example 21 | Example 22 | Example 23 | Example 24 | Comp. Example 5 | Comp. Example 6 |
|---|---|---|---|---|---|---|---|---|
|  | (S) |  |  |  | S-3a 20 | S-3b 20 |  |  |
| Other thermoplastic resin (parts by weight) | (F-1) | 17 | 17 | 17 | 17 | 17 | 17 | 17 |
|  | (F-2) | 43 | 43 | 43 | 43 | 43 | 43 | 43 |
| MI*1 | (g/10 min) | 3.6 | 3.4 | 3.5 | 4.1 | 3.3 | 3.3 | 2.1 |
| Izod impact strength*2 |  |  |  |  |  |  |  |  |
| measured at 23° C. | (J/m) | 105 | 110 | 95 | 110 | 125 | 100 | 115 |
| measured at −30° C. | (J/m) | 66 | 63 | 58 | 70 | 55 | 62 | 68 |
| Molding gas evolution (280° C.) |  | ○ | ○ | ○ | ○ | ○ | x | ○ |

*1MI was measured at 220° C. under loading of 98 N (10 kgf)
*2Izod specimen has a thickness of ¼ inch

TABLE 5

|  |  | Example 25 | Example 26 | Example 27 | Example 28 | Example 29 | Comp. Example 7 | Comp. Example 8 |
|---|---|---|---|---|---|---|---|---|
| Graft copolymer (parts by weight) | (G) | G-1 40 | G-2 40 | G-3 40 | G-1 20 | G-1 20 |  |  |
|  | (H) |  |  |  |  |  | H-1 40 | H-2 40 |
|  | (S) |  |  |  | S-3a 20 | S-3b 20 |  |  |
| Other thermoplastic resin (parts by weight) | (F-4) | 60 | 60 | 60 | 60 | 60 | 60 | 60 |
| MI*1 | (g/10 min) | 6.2 | 6.1 | 6.3 | 6.1 | 6.0 | 6.9 | 4.8 |
| Izod impact strength*2 |  |  |  |  |  |  |  |  |
| measured at 23° C. | (J/m) | 135 | 120 | 145 | 130 | 160 | 125 | 140 |
| measured at −30° C. | (J/m) | 63 | 61 | 63 | 63 | 58 | 60 | 64 |
| Molding gas evolution (280° C.) |  | ○ | ○ | ○ | ○ | ○ | x | ○ |
| Weather resistance ΔE |  | 1.1 | 1.2 | 1.1 | 1.3 | 0.8 | 1.0 | 1.1 |

*1MI was measured at 230° C. under loading of 37 N (3.8 kgf)
*2Izod specimen has a thickness of ¼ inch

TABLE 6

|  |  | Example 30 | Example 31 | Example 32 | Example 33 | Example 34 | Comp. Example 9 | Comp. Example 10 |
|---|---|---|---|---|---|---|---|---|
| Graft copolymer (parts by weight) | (G) | G-1 40 | G-2 40 | G-3 40 | G-1 20 | G-1 20 |  |  |
|  | (H) |  |  |  |  |  | H-1 40 | H-2 40 |
|  | (S) |  |  |  | S-3a 20 | S-3b 20 |  |  |
| Other thermoplastic resin (parts by weight) | (F-5) | 60 | 60 | 60 | 60 | 60 | 60 | 60 |
| MI*1 | (g/10 min) | 2.3 | 2.2 | 2.4 | 2.3 | 2.1 | 2.5 | 1.6 |
| Izod impact strength*2 |  |  |  |  |  |  |  |  |
| measured at 23° C. | (J/m) | 115 | 105 | 120 | 110 | 120 | 110 | 120 |
| measured at −30° C. | (J/m) | 65 | 63 | 65 | 66 | 49 | 61 | 64 |
| Molding gas evolution (280° C.) |  | ○ | ○ | ○ | ○–Δ | ○ | x | ○ |
| Weather resistance ΔE |  | 0.8 | 0.7 | 0.9 | 1.0 | 0.6 | 0.8 | 0.9 |

*1MI was measured at 230° C. under loading of 37 N (3.8 kgf)
*2Izod specimen has a thickness of ¼ inch

TABLE 7

|  |  | Example 34 | Example 35 | Example 36 | Example 37 | Example 38 | Comp. Example 11 | Comp. Example 12 |
|---|---|---|---|---|---|---|---|---|
| Graft copolymer (parts by weight) | (G) | G-1 24 | G-2 24 | G-3 24 | G-1 12 | G-1 18 |  |  |
|  | (H) |  |  |  |  |  | H-1 24 | H-2 24 |
|  | (S) |  |  |  | S-3a 12 | S-3b 6 |  |  |

TABLE 7-continued

|  |  | Example 34 | Example 35 | Example 36 | Example 37 | Example 38 | Comp. Example 11 | Comp. Example 12 |
|---|---|---|---|---|---|---|---|---|
| Other thermoplastic resin (parts by weight) | (F-1) | 16 | 16 | 16 | 16 | 16 | 16 | 16 |
|  | (F-6) | 60 | 60 | 60 | 60 | 60 | 60 | 60 |
| MI*1 | (g/10 min) | 7.7 | 7.4 | 7.8 | 7.3 | 7.5 | 7.3 | 5.2 |
| Izod impact strength*2 |  |  |  |  |  |  |  |  |
| measured at 23° C. | (J/m) | 630 | 650 | 590 | 725 | 760 | 620 | 635 |
| measured at −30° C. | (J/m) | 270 | 255 | 208 | 265 | 313 | 248 | 250 |
| Molding gas evolution (280° C.) |  | ○ | ○ | ○ | ○ | ○ | x | ○ |

*1MI was measured at 220° C. under loading of 98 N (10 kgf)
*2Izod specimen has a thickness of ¼ inch

TABLE 8

|  |  | Example 39 | Example 40 | Example 41 | Example 42 | Comp. Example 13 | Comp. Example 14 |
|---|---|---|---|---|---|---|---|
| Graft copolymer (parts by weight) | (G) | G-1<br>46 | G-2<br>46 | G-3<br>46 | G-1<br>23 |  |  |
|  | (H) |  |  |  |  | H-1<br>46 | H-1<br>46 |
|  | (S) |  |  |  | S-3a<br>23 |  |  |
| Other thermoplastic resin (parts by weight) | (F-1) | 54 | 54 | 54 | 54 | 54 | 54 |
| Bromine flame retardant (parts by weight) | SR-T104N | 25 | 25 | 25 | 25 | 25 | 25 |
| Antimony trioxide (parts by weight) |  | 7 | 7 | 7 | 7 | 7 | 7 |
| Chlorinate polyethylene (parts by weight) | E-230 | 2.5 | 2.5 | 2.5 |  | 2.5 | 2.5 |
| Polytetrafluoroethylene (parts by weight) |  |  |  |  | 0.1 |  |  |
| Silicone oil (parts by weight) |  | 0.02 | 0.02 | 0.02 | 0.02 | 0.02 | 0.02 |
| MI*1 | (g/10 min) | 3.8 | 3.7 | 3.4 | 3.4 | 3.6 | 2.8 |
| Izod impact strength*2 |  |  |  |  |  |  |  |
| measured at 23° C. | (J/m) | 118 | 120 | 105 | 110 | 116 | 110 |
| measured at −30° C. | (J/m) | 53 | 55 | 48 | 62 | 55 | 52 |
| Flame retardancy [UL-94] |  | V-0 | V-0 | V-0 | V-0 | V-0 | V-0 |
| Molding gas evolution (250° C.) |  | ○ | ○ | ○ | ○ | x | ○ |

*1MI was measured at 200° C. under loading of 49 N (5 kgf)
*2Izod specimen has a thickness of ¼ inch

TABLE 9

|  |  | Example 43 | Example 44 | Example 45 | Example 46 | Example 47 | Comp. Example 15 | Comp. Example 16 |
|---|---|---|---|---|---|---|---|---|
| Graft copolymer (parts by weight) | (G) | G-1<br>27 | G-2<br>27 | G-3<br>27 | G-1<br>13.5 | G-1<br>22 |  |  |
|  | (H) |  |  |  |  |  | H-1<br>27 | H-2<br>27 |
|  | (S) |  |  |  | S-3a<br>13.5 | S-3b<br>5 |  |  |
| Other thermoplastic resin (parts by weight) | (F-1) | 18 | 18 | 18 | 18 | 18 | 18 | 18 |
|  | (F-6) | 55 | 55 | 55 | 55 | 55 | 55 | 55 |
| Bromine flame retardant (parts by weight) | SR-T104N | 15 | 15 | 15 | 15 | 15 | 15 | 15 |
| Antimony trioxide (parts by weight) |  | 5 | 5 | 5 | 5 | 5 | 5 | 5 |
| MI*1 | (g/10 min) | 9.5 | 9.1 | 9.2 | 9.0 | 9.3 | 9.3 | 7.3 |
| Izod impact strength*2 |  |  |  |  |  |  |  |  |
| measured at 23° C. | (J/m) | 450 | 460 | 435 | 470 | 490 | 445 | 440 |
| measured at −30° C. | (J/m) | 190 | 205 | 183 | 210 | 220 | 202 | 188 |
| Flame retardancy [UL-94] |  | V-0 | V-0 | V-0 | V-0 | V-0 | V-0 | V-0 |
| Molding gas evolution (250° C.) |  | ○ | ○ | ○ | ○ | ○ | x | ○ |

*1MI was measured at 220° C. under loading of 98 N (10 kgf)
*2Izod specimen has a thickness of ¼ inch

TABLE 10

|  |  | Example 48 | Example 49 | Example 50 | Example 51 | Example 52 | Comp. Example 17 |
|---|---|---|---|---|---|---|---|
| Graft copolymer (parts by weight) | (G) | G-1 20 | G-2 20 | G-3 20 | G-1 10 | G-1 10 | |
|  | (H) |  |  |  |  |  | H-1 20 |
|  | (S) |  |  |  | S-3a 10 | S-3b 10 | |
| Other thermoplastic resin (parts by weight) | (F-6) | 80 | 80 | 80 | 80 | 80 | 80 |
| Triphenyl phosphate (parts by weight) |  | 15 | 15 | 15 | 15 | 15 | 15 |
| MI*1 | (g/10 min) | 25.4 | 24.3 | 26.1 | 24.5 | 25.9 | 27.1 |
| Izod impact strength*2 |  |  |  |  |  |  |  |
| measured at 23° C. | (J/m) | 575 | 545 | 605 | 510 | 590 | 580 |
| Flame retardancy [UL-94] |  | V-0 | V-0 | V-0 | V-0 | V-0 | V-0 |
| Molding gas evolution (250° C.) |  | o–Δ | o–Δ | o–Δ | o–Δ | o–Δ | x |

*1MI was measured at 220° C. under loading of 98 N (10 kgf)
*2Izod specimen has a thickness of ¼ inch

TABLE 11

|  |  | Example 53 | Example 54 | Example 55 | Example 56 | Example 57 | Comp. Example 18 | Comp. Example 19 |
|---|---|---|---|---|---|---|---|---|
| Graft copolymer (parts by weight) | (G) | G-1 32 | G-2 32 | G-3 32 | G-1 16 | G-1 26 | | |
|  | (H) |  |  |  |  |  | H-1 32 | H-2 32 |
|  | (S) |  |  |  | S-3a 16 | S-3b 6 | | |
| Other thermoplastic resin (parts by weight) | (F-1) | 28 | 28 | 28 | 28 | 28 | 28 | 28 |
|  | (F-6) | 40 | 40 | 40 | 40 | 40 | 40 | 40 |
| Bromine flame retardant (parts by weight) | SR-T104N | 15 | 15 | 15 | 15 | 15 | 15 | 15 |
| Antimony trioxide (parts by weight) |  | 3 | 3 | 3 | 3 | 3 | 3 | 3 |
| Filler | Carbon filler | 12 | 12 | 12 | 12 | 12 | 12 | 12 |
| MI*1 | (g/10 min) | 2.4 | 2.5 | 2.3 | 2.2 | 2.5 | 2.4 | 1.7 |
| Izod impact strength*2 |  |  |  |  |  |  |  |  |
| measured at 23° C. | (J/m) | 90 | 92 | 88 | 92 | 96 | 90 | 89 |
| measured at −30° C. | (J/m) | 36 | 35 | 34 | 35 | 45 | 35 | 33 |
| Flame retardancy [UL-94] |  | V-0 | V-0 | V-0 | V-0 | V-0 | V-0 | V-0 |
| Molding gas evolution (250° C.) |  | o | o | o | o | o | x | o |

*1MI was measured at 220° C. under loading of 98 N (10 kgf)
*2Izod specimen has a thickness of ¼ inch

TABLE 12

|  |  | Example 58 | Example 59 | Example 60 | Example 61 | Example 62 | Comp. Example 20 |
|---|---|---|---|---|---|---|---|
| Graft copolymer (parts by weight) | (G) | G-1 30 | G-2 30 | G-3 30 | G-1 15 | G-1 15 | |
|  | (H) |  |  |  |  |  | H-1 30 |
|  | (S) |  |  |  | S-3a 15 | S-3b 15 | |
| Other thermoplastic resin (parts by weight) | (F-1) | 20 | 20 | 20 | 20 | 20 | 20 |
|  | (F-6) | 40 | 40 | 40 | 40 | 40 | 40 |
|  | (F-7) | 10 | 10 | 10 | 10 | 10 | 10 |
| Red phosphorous (parts by weight) |  | 5 | 5 | 5 | 5 | 5 | 5 |
| MI*1 | (g/10 min) | 21.3 | 20.4 | 22.2 | 20.6 | 21.8 | 23.5 |
| Izod impact strength*2 |  |  |  |  |  |  |  |
| measured at 23° C. | (J/m) | 180 | 170 | 185 | 170 | 180 | 175 |

TABLE 12-continued

|  | Example 58 | Example 59 | Example 60 | Example 61 | Example 62 | Comp. Example 20 |
|---|---|---|---|---|---|---|
| Flame retardancy [UL-94] | V-0 | V-0 | V-0 | V-0 | V-0 | V-0 |
| Molding gas evolution (250° C.) | ○ | ○ | ○ | ○ | ○ | x |

*1MI was measured at 220° C. under loading of 98 N (10 kgf)
*2Izod specimen has a thickness of ⅛ inch

TABLE 13

|  |  | Example 63 | Example 64 | Example 65 | Example 66 | Example 67 | Comp. Example 21 | Comp. Example 22 |
|---|---|---|---|---|---|---|---|---|
| Graft copolymer (parts by weight) | (G) | G-1<br>25 | G-2<br>25 | G-3<br>25 | G-1<br>13 | G-1<br>13 |  |  |
|  | (H) |  |  |  |  |  | H-1<br>25 | H-2<br>25 |
|  | (S) |  |  |  | S-3a<br>12 | S-3b<br>12 |  |  |
| Other thermoplastic resin (parts by weight) | (F-3) | 15 | 15 | 15 | 15 | 15 | 15 | 15 |
|  | (F-7) | 60 | 60 | 60 | 60 | 60 | 60 | 60 |
| Izod impact strength*1 |  |  |  |  |  |  |  |  |
| measured at 23° C. | (J/m) | 550 | 510 | 585 | 525 | 605 | 560 | 565 |
| Short shot pressure | % | 28 | 27 | 28 | 29 | 27 | 26 | 31 |
| Molding gas evolution (280° C.) |  | ○ | ○ | ○ | ○ | ○ | x | ○ |

*1Izod specimen has a thickness of ¼ inch

TABLE 14

|  |  | Example 68 | Example 69 | Example 70 | Example 71 | Example 72 | Example 73 | Example 74 | Comp. Example 23 |
|---|---|---|---|---|---|---|---|---|---|
| Graft copolymer (parts by weight) | (G) | G-1<br>25 | G-1<br>25 | G-1<br>25 | G-2<br>25 | G-3<br>25 | G-1<br>13 | G-1<br>13 |  |
|  | (H) |  |  |  |  |  |  |  | H-1<br>25 |
|  | (S) |  |  |  |  |  | S-3a<br>12 | S-3b<br>12 |  |
| Other thermoplastic resin (parts by weight) | (F-3) | 15 | 15 | 15 | 15 | 15 | 15 | 15 | 15 |
|  | (F-7) | 60 | 60 | 60 | 60 | 60 | 60 | 60 | 60 |
| Filler | Glass fiber | 35 |  |  |  |  |  |  |  |
|  | Carbon fiber |  | 30 |  | 30 | 30 | 30 | 30 | 30 |
|  | Talc |  |  | 30 |  |  |  |  |  |
| Izod impact strength*1 |  |  |  |  |  |  |  |  |  |
| measured at 23° C. | (J/m) | 195 | 225 | 160 | 180 | 210 | 185 | 210 | 215 |
| Short shot pressure | % | 35 | 36 | 34 | 35 | 34 | 36 | 35 | 33 |
| Molding gas evolution (280° C.) |  | ○ | ○ | ○ | ○ | ○ | ○ | ○ | x |

*1Izod specimen has a thickness of ¼ inch

TABLE 15

|  |  | Example 75 | Example 76 | Example 77 | Example 78 | Example 79 | Comp. Example 24 | Comp. Example 25 |
|---|---|---|---|---|---|---|---|---|
| Graft copolymer (parts by weight) | (G) | G-1<br>30 | G-2<br>30 | G-3<br>30 | G-1<br>15 | G-1<br>15 |  |  |
|  | (H) |  |  |  |  |  | H-1<br>30 | H-2<br>30 |
|  | (S) |  |  |  | S-3a<br>15 | S-3b<br>15 |  |  |
| Other thermoplastic resin (parts by weight) | (F-3) | 30 | 30 | 30 | 30 | 30 | 30 | 30 |
|  | (F-6) | 20 | 20 | 20 | 20 | 20 | 20 | 20 |
|  | (F-7) | 30 | 30 | 30 | 30 | 30 | 30 | 30 |

TABLE 15-continued

|  |  | Example 75 | Example 76 | Example 77 | Example 78 | Example 79 | Comp. Example 24 | Comp. Example 25 |
|---|---|---|---|---|---|---|---|---|
| Izod impact strength*1 | | | | | | | | |
| measured at 23° C. | (J/m) | 445 | 410 | 470 | 415 | 425 | 385 | 470 |
| measured at −30° C. | (J/m) | 196 | 188 | 203 | 201 | 221 | 173 | 205 |
| Short shot pressure | (%) | 27 | 26 | 27 | 28 | 27 | 25 | 30 |
| Molding gas evolution (280° C.) | | ○ | ○ | ○ | ○ | ○ | x | ○ |

*1Izod specimen has a thickness of ¼ inch

TABLE 16

|  |  | Example 80 | Example 81 | Example 82 | Example 83 | Example 84 | Example 85 | Example 86 | Comp. Example 26 | Comp. Example 27 |
|---|---|---|---|---|---|---|---|---|---|---|
| Graft copolymer (parts by weight) | (G) | G-1 40 | G-1 40 | G-1 40 | G-2 40 | G-3 40 | G-1 20 | G-1 20 | | |
| | (H) | | | | | | | | H-1 40 | H-2 40 |
| | (S) | | | | | | S-3a 20 | S-3b 20 | | |
| Other thermoplastic resin (parts by weight) | (F-1) | 57 | 57 | 57 | 57 | 57 | 57 | 57 | 57 | 57 |
| | (F-8) | 3 | 3 | 3 | 3 | 3 | 3 | 3 | 3 | 3 |
| Filler | Wollastonite | 10 | | | 10 | 10 | 10 | 10 | 10 | 10 |
| | Talc | | 10 | | | | | | | |
| | Mica | | | 10 | | | | | | |
| Drawdown | | ○ | ○ | ○ | ○ | ○ | ○ | ○ | ○ - Δ | ○ |
| Linear expansion coefficient | | ○ | ○ | ○ | ○ | ○ | ○ | ○ | ○ | ○ |
| Molding gas evolution (210° C.) | | ○ | ○ | ○ | ○ | ○ | ○ | ○ | Δ - x | ○ |

Examples 87 to 91 and Comparative Example 28

Preparation of Thermoplastic Resin Compositions

10 Parts of the graft copolymers (G) prepared in Example 1 and the other graft copolymers (S) and (H) alone or in combination, 88 parts of the above vinyl chloride resin, 2 parts of the other thermoplastic resin (F-1), 1.5 parts of dibutyltin mercaptide ("T-17MJ", manufactured by Katsuda Kako Co., Ltd.) as the stabilizer, 1.2 parts of calcium stearate, 0.5 parts of glycerin monostearate ("RIKEMAL S-100A" manufactured by Riken Vitamin Co., Ltd.) and 5 parts of calcium carbonate as the filler were mixed using a Henschel mixer, and then pelletized by using a 30 mm φ uniaxial extruder (L/D=20) adjusted to a barrel temperature of 180° C. Furthermore, a square bar was extruded at a screw speed of 30 rpm by using a 30 mm φ uniaxial extruder ("Laboplaskomill", manufactured by Toyo Seiki Co., Ltd.) adjusted to a barrel temperature of 190° C. and the amount of a gas evolved was evaluated by the procedure described above. The resulting square bar was provided with a V-shaped notch and the Izod impact strength was determined. The results are shown in Table 17. In the table, the amount is represented by parts by weight.

TABLE 17

|  |  | Example 87 | Example 88 | Example 89 | Example 90 | Example 91 | Comp. Example 28 |
|---|---|---|---|---|---|---|---|
| Graft copolymer (parts by weight) | (G) | G-1 10 | G-2 10 | G-3 10 | G-1 5 | G-1 5 | |
| | (H) | | | | | | H-1 10 |
| | (S) | | | | S-3a 5 | S-3b 5 | |
| Other thermoplastic resin (parts by weight) | (F-1) | 2 | 2 | 2 | 2 | 2 | 2 |
| | (F-9) | 88 | 88 | 88 | 88 | 88 | 88 |
| Izod impact strength*1 | measured at 23° C. (J/m) | 330 | 295 | 340 | 1,360 | 1,450 | 310 |
| | measured at −30° C. (J/m) | 59 | 57 | 60 | 58 | 83 | 58 |
| Molding gas evolution (190° C.) | | ○ | ○ | ○ | ○ | ○ | Δ - X |

*1: Izod specimen has a thickness of 1/4 inch

TABLE 18

| | Other thermoplastic resin (F) | Extruder barrel setting temperature (° C.) | Molder cylinder setting temperature (° C.) | Molding gas evolution |
|---|---|---|---|---|
| Example 92 | Polypropylene resin | 200 | 220 | ○ |
| Example 93 | Polyethylene resin | 200 | 220 | ○ |
| Example 94 | Polystyrene resin | 200 | 220 | ○ |
| Example 95 | High-impact polystyrene resin | 210 | 230 | ○ |
| Example 96 | Polyarylate resin | 300 | 300 | ○ – Δ |
| Example 97 | Liquid crystal polyester resin | 350 | 350 | ○ – Δ |
| Example 98 | Polyphenylene sulfide resin | 350 | 350 | ○ – Δ |
| Example 99 | 6-nylon resin | 280 | 280 | ○ – Δ |
| Example 100 | 6,6-nylon resin | 300 | 300 | ○ – Δ |
| Example 101 | Polyacetal resin | 170 | 200 | ○ |
| Example 102 | Modified PPE resin | 260 | 260 | ○ |
| Example 103 | Nylon/PPE alloy resin | 290 | 290 | ○ – Δ |

Examples 92 to 103

Preparation of Thermoplastic Resin Composition

10 Parts of the graft copolymer (G-1) prepared in Example 1 and 90 parts of each thermoplastic resin shown in Table 18 were mixed by using a Henschel mixer, and then extruded under the conditions of the set barrel temperature shown in Table 18 to prepare thermoplastic resin composition pellets containing the graft copolymer (G-1). In the same manner, a plate of 100 mm×100 mm in size was molded at the set cylinder temperature shown in Table 18, and the amount of a gas evolved was evaluated by the procedure described above.

In Table 18, the following resins were employed as the respective resins.

Polypropylene resin: "NOVATEC PP MA4" manufactured by Japan Polychem Co., Ltd.

Polyethylene resin: "NOVATEC LL UE320" manufactured by Japan Polychem Co., Ltd.

Polystyrene resin: "SUMIBRIGHT GP M140" manufactured by Sumitomo Chemical Industries Co., Ltd.

High-impact polystyrene resin: "SUMIBRIGHT H1 M540" manufactured by Sumitomo Chemical Industries Co., Ltd.

Polyarylate resin: "U POLYMER U-100" manufactured by Unitika Co., Ltd.

Liquid crystal polyester resin: "NOVACCULATE E335G30" manufactured by Mitsubishi Engineering-Plastics Corporation Polyphenylene sulfide resin: "NOVAPPS 770R20" manufactured by Mitsubishi Engineering-Plastics Corporation 6-nlyon resin: "NOVAMID 1013C" manufactured by Mitsubishi Engineering-Plastics Corporation 6,6-nlyon resin: "NOVAMID 30100SR" manufactured by Mitsubishi Engineering-Plastics Corporation Polyacetal resin: "DURACON M140" manufactured by Polyplastic Co., Ltd.

Modified polyphenylene ether (PPE) resin: "NORYL 731J" manufactured by Nippon GE Plastic Co., Ltd.

Nylon/PPE alloy resin: "NORYL GTX600" manufactured by Nippon GE Plastic Co., Ltd.

The followings are made apparent from the Examples and Comparative Examples.

(1) Any of the thermoplastic resin compositions (Example 8–43) containing the graft copolymers (G-1 to G-7) prepared in Examples 1 to 7 exhibited high fluidity and less molding gas evolution. Since the material, which exhibits high fluidity and causes less molding gas evolution, has excellent moldability on injection molding and has good pigmentation and weather resistance, its value in industrial use is very high.

(2) The thermoplastic resin composition containing the graft copolymer (G-1) of Example 8 exhibits high Izod impact strength and is superior in gloss of molding in case of molding at 280° C. On the other hand, the thermoplastic resin composition containing the graft copolymer (G-2) of Example 9 exhibits a tendency to slightly lower the gloss of the molded article obtained by molding at high temperature, while the thermoplastic resin composition containing the graft copolymer (G-3) of Example 10 exhibits a tendency to slightly lower the Izod impact strength.

(3) The thermoplastic resin composition containing the graft copolymer (H-1) prepared in Comparative Example 1 caused much gas evolution during the molding at high temperature. The thermoplastic resin composition, which causes much gas evolution during the molding, tend to make the working environment during the molding worse, or contaminate a mold with a volatile component during the injection molding thereby to cause corrosion of the mold. Therefore, its industrial value is low.

(4) The thermoplastic resin composition containing the graft copolymer (H-2) prepared in Comparative Example 2 exhibited poor fluidity because of low MI value or high short shot pressure. Regarding such a resin material, the injection molding conditions and the shape of the molded article are limited. Therefore, its industrial value is low.

Industrial Applicability

As described above, the thermoplastic resin composition, which contains a graft copolymer (G) containing a specific amount of an emulsifier residue of the present invention, is superior in impact resistance, fluidity and weather resistance and causes less gas evolution, and is also superior in molding appearance.

Its balance between high fluidity and small amount of a gas evolved during the molding is a very high level, which can not attained in case of a resin composition containing a graft copolymer which contains a conventionally known (meth)acrylate rubber as a constituent component. Accordingly, its value in use as various industrial materials, especially weather-resistant material, is high.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A graft copolymer (G) which is prepared by emulsion graft polymerization of
   a rubber polymer comprising 1–40% by weight of a butadiene unit and 60–100% by weight of a (meth) acrylate unit, and
   at least one monomer selected from the group consisting of an aromatic alkenyl compound, a methacrylate, an acrylate and a vinyl cyanide compound,
   said graft copolymer containing 0.5–2.0% by weight of an emulsifier residue.

2. A graft copolymer (G) according to claim 1, wherein said rubber polymer is a composite rubber polymer obtained by emulsion polymerization of a (meth)acrylate component using a graft-linking agent and a crosslinking agent in combination in the presence of a butadiene polymer having a weight-average particle diameter within a range of 200–500 nm.

3. A graft copolymer (G) according to claim 2, wherein said butadiene polymer is enlarged by an acid group-containing copolymer latex.

4. A graft copolymer (G) according to claim 1, wherein said emulsifier residue is an acidic emulsifier having two or more functional groups in a molecule, or a salt thereof.

5. A graft copolymer (G) according to claim 4, wherein said acidic emulsifier having two or more functional groups in a molecule, or a salt thereof, is alkenylsuccinic acid or a salt thereof.

6. A graft copolymer (G) according to claim 1, wherein a 1% weight loss temperature on the measurement of TG-DTA under the conditions of 20° C./minute is 300° C. or higher.

7. A graft copolymer (G) according to claim 1, wherein the amount of particles having a particle diameter less than 100 nm contained in the rubber polymer is within a range of 1–30% by weight.

8. A graft copolymer (G) according to claim 1, wherein the weight-average particle diameter of said rubber polymer is within a range of 200–500 nm.

9. A graft copolymer (G) according to claim 8, wherein the weight-average particle diameter of said rubber polymer is within a range of 250–450 nm.

10. A method of preparing a graft copolymer (G), comprising:
    emulsion graft polymerizing of
      a rubber polymer comprising 1–40% by weight of a butadiene unit and 60–100% by weight of a (meth) acrylate unit, and
      at least one monomer selected from the group consisting of an aromatic alkenyl compound, a methacrylate, an acrylate and a vinyl cyanide compound,
    controlling an amount of an emulsifier so that an amount of a residue of said emulsifier in said graft copolymer is within a range of 0.5–2.0% by weight, or
    controlling the conditions of a washing treatment of said graft copolymer, to obtain a residue of said emulsifier in said graft copolymer of 0.5 to 2.0% by weight.

11. The method of preparing a graft copolymer (G) according to claim 10, wherein said emulsifier residue is an acid type emulsifier having two or more functional groups in a molecule, or a salt thereof.

12. The method of preparing a graft copolymer (G) according to claim 11, wherein said emulsifier is an alkenylsuccinic acid or a salt thereof.

13. A thermoplastic resin composition, comprising:
    1–100% by weight of the graft copolymer (G) of claim 1,
    99–0% by weight of a second graft copolymer (S) and/or a second thermoplastic resin composition (F);
    wherein a total amount of (G) and (S) and/or (F) is 100% by weight.

14. The thermoplastic resin composition according to claim 13, wherein said second thermoplastic resin (F) is at least one member selected from the group consisting of acrylic resin, acrylonitrile-styrene (AS) resin, acrylonitrile-styrene-N-substituted maleimide terpolymer, styrene-maleic anhydride copolymer, styrene-maleic anhydride-N-substituted maleimide terpolymer, acrylonitrile-styrene-(meth)acrylate terpolymer, polyolefin resin, polyvinyl chloride resin, polystyrene resin, polyamide resin, polyester resin, polycarbonate resin, polyphenylene ether resin, polyacetal resin, polyarylate resin, polyphenylene sulfide resin, polyether ether ketone resin (PEEK resin), and polyether sulfone resin (PES resin).

15. The thermoplastic resin composition according to claim 13, wherein said second graft copolymer (S) is at least one member selected from the group consisting of ABS resin (S-1), ethylene-propylene-non-conjugated diene rubber graft copolymer (S-2) and polyorganosiloxane/(meth) acrylate composite rubber graft copolymer (S-3).

16. The thermoplastic resin composition according to claim 13, further comprising:
    5–40 parts by weight of a bromine flame retardant, and 0.1–20 parts by weight of an antimony compound, relative to 100 parts by weight of said thermoplastic resin composition.

17. The thermoplastic resin composition according to claim 13, further comprising:
    1–40 parts by weight of a phosphorous flame retardant and 0–20 parts by weight of a bromine flame retardant, relative to 100 parts by weight of said thermoplastic resin composition.

18. A thermoplastic resin composition according to claim 13, further comprising:
    0.0001–5 parts by weight of at least one auxiliary flame retardant selected from polytetrafluoroethylene, chlorinated polyethylene and silicone oil, based on 100 parts by weight of said thermoplastic resin composition.

19. The thermoplastic resin composition according to claim 13, further comprising:
    1–50 parts by weight of an inorganic filler, relative to 100 parts by weight of said thermoplastic resin composition.

20. A molded article which is prepared by molding said thermoplastic resin composition of claim 13.

21. A molded article according to claim 20, which is a housing for electric appliance or vehicle parts.

* * * * *